United States Patent
Beckwith et al.

(10) Patent No.: US 6,330,598 B1
(45) Date of Patent: *Dec. 11, 2001

(54) GLOBAL SERVICE MANAGEMENT SYSTEM FOR AN ADVANCED INTELLIGENT NETWORK

(75) Inventors: Scott Alan Beckwith, East Troy, WI (US); John D Curtis, Flower Mound, TX (US); Ronald Joseph Ginter, Nashotah, WI (US); Mark Wade Layman, Colorado Springs, CO (US); Steven Louis Mather, Tampa, FL (US); Keith Allen McMillan, Milwaukee, WI (US)

(73) Assignee: Ameritech Corporation, Hoffman Estates, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,286

(22) Filed: Jun. 23, 1998

(51) Int. Cl.[7] .................................................. G06F 15/16
(52) U.S. Cl. ........................ 709/223; 709/224; 709/246
(58) Field of Search .................................. 709/223, 224, 709/246, 205; 370/401, 352; 379/207, 15.02, 34; 707/10, 104

(56) References Cited

U.S. PATENT DOCUMENTS

| 5,212,789 | 5/1993 | Rago ..................................... 395/600 |
| 5,247,571 | 9/1993 | Kay et al. ............................. 379/207 |
| 5,386,467 | 1/1995 | Ahmad ................................. 379/220 |
| 5,392,402 | 2/1995 | Robrock, II .......................... 395/200 |
| 5,418,844 | 5/1995 | Morrisey et al. .................... 379/207 |
| 5,436,957 | 7/1995 | McConnell ............................ 379/88 |
| 5,517,562 | 5/1996 | McConnell .......................... 379/207 |
| 5,524,146 | 6/1996 | Morrisey et al. .................... 379/207 |
| 5,541,917 | 7/1996 | Farris ................................. 370/60.1 |
| 5,546,574 | 8/1996 | Grosskopf et al. .................. 395/600 |
| 5,553,130 | 9/1996 | Turner ................................. 379/220 |
| 5,566,235 | 10/1996 | Hetz ..................................... 379/201 |
| 5,570,410 | 10/1996 | Hooshiari ............................. 379/32 |
| 5,579,318 | 11/1996 | Reuss et al. ........................ 370/94.2 |
| 5,579,384 | * 11/1996 | Seymour .............................. 709/223 |
| 5,581,610 | 12/1996 | Hooshiari ............................ 379/133 |
| 5,583,920 | 12/1996 | Wheeler, Jr. .......................... 379/88 |
| 5,594,789 | 1/1997 | Seazholtz et al. ................... 379/207 |

(List continued on next page.)

OTHER PUBLICATIONS

Aitken, D.J., "Experiences of Implementation using Advanced Intelligent Network Release 1 Architecture", 1992, Eighth International Conference on Software Engineering for Telecommunication System Services, pp. 19–26.*

*Primary Examiner*—Robert B. Harrell
*Assistant Examiner*—Almari Romero
(74) *Attorney, Agent, or Firm*—Brinks Hofer Gilson & Lione

(57) ABSTRACT

A global service management system (GSMS) for use in an advanced intelligent network is provided. The GSMS is adapted to communicate with two or more network element managers servicing SCPs and operating pursuant to different protocols. Upon receiving an update request message, the GSMS identifies the destination(s) of the message, translates the message into the protocol(s) used at the destination(s) as needed, and routes the translated message to the identified destination(s). In some embodiments, the GSMS is adapted to develop an indication of a status of a service package in response to a request message. The indication includes data identifying any changes in the service package occurring within a predefined time period.

35 Claims, 13 Drawing Sheets

U.S. PATENT DOCUMENTS

| | | | |
|---|---|---|---|
| 5,619,562 | 4/1997 | Maurer et al. | 379/201 |
| 5,629,974 | 5/1997 | Rajala et al. | 379/58 |
| 5,644,619 | 7/1997 | Farris et al. | 379/27 |
| 5,651,053 | 7/1997 | Mitchell | 379/67 |
| 5,664,102 | 9/1997 | Faynberg | 395/200.76 |
| 5,706,286 * | 1/1998 | Reiman et al. | 370/401 |
| 5,864,614 * | 1/1999 | Farris et al. | 379/207 |
| 5,890,156 * | 3/1999 | Rekieta et al. | 707/10 |
| 5,937,412 * | 8/1999 | Kohli et al. | 707/104 |
| 5,991,803 * | 11/1999 | Glitho et al. | 709/220 |
| 6,018,567 * | 1/2000 | Dulman | 379/34 |
| 6,101,182 * | 8/2000 | Sistanizadeh et al. | 370/352 |
| 6,161,128 * | 12/2000 | Smyk | 709/205 |

\* cited by examiner

GLOBAL SERVICE MANAGEMENT SYSTEM FOR AN ADVANCED INTELLIGENT NETWORK

FIELD OF THE INVENTION

The present invention relates generally to telecommunications and, more particularly, to a global service management system for an advanced intelligent network.

BACKGROUND OF THE INVENTION

Advanced Intelligent Network (AIN) systems are presently being employed by telecommunications companies including the Regional Bell Operating Companies (RBOCs) to provide advanced subscription services to subscribers. Examples of advanced subscription services include the ability to route a call to a customer-defined location based on the zip code of the calling party; and the ability to enable a customer to restrict or prevent calls to predefined numbers specified by (and under the control of) the customer.

In the present system architecture, the switching network comprises a number of end offices equipped to communicate under the Signaling System 7 (SS7) protocol. In AIN nomenclature, these end offices are termed Signal Switching Points (SSPs). The switching network also includes Signal Transfer Points (STPs), which are packet switching devices implemented to communicate messages between SSPs and Signal Control Points (SCPs). SCPs are commercially available, special purpose computing equipment associated with a predetermined geographic area and including substantial databases identifying those subscribers and the AIN services subscribers have requested (e.g., call waiting, etc.).

When a call is initiated, it is routed to an end office such as an SSP. If the SSP identifies a "trigger" associated with the call (i.e., a prefix identifying the call as one subject to an AIN service subscription by virtue of the calling or receiving subscriber's service contract), it develops a query containing certain information and requesting instruction on processing the call. The query is routed to an STP which, after conducting certain processing steps irrelevant here, forwards the processed query to an appropriate one of a number of SCPs (identified by an identifier in the query) for directions on how to process the call. The SCP addresses its database and replies to the processed query received from the STP, thereby ensuring the call is processed per the subscriber's predefined service requirements.

In the typical architecture, a plurality of SCPs are employed. These SCPs are typically located in two or more locations and assigned to service different subscribers. (In some instances, multiple SCPs have the capability to service the same subscribers thereby providing redundancy in case of failure). The operation of the SCPs are typically managed by one or more network element managers. Network element managers are computers provided by the vendor(s) of the SCPs. Each SCP vendor provides its own network element manager to manage its SCPs. Thus, if a given telecommunications company purchases SCPs from more than one vendor, it will have more than one network element manager. Typically, network element managers from different vendors are not adapted to communicate with one another and operate pursuant to different protocols.

In order to add new subscribers or services to the AIN, or to update the package of existing services for a given subscriber, it is necessary to update the databases of one or more of the SCPs in service. If a given telecommunications company employs SCPs from different vendors, it will be required to process such updates differently depending upon the SCP being addressed. In other words, vendor A's SCPs will have to be addressed differently than vendor B's SCPs. This disparity interjects confusion, delay, and added cost into the service provisioning process.

Some telecommunications companies have sought to address this problem by discarding the network element managers provided by the vendors of the SCPs and substituting one or more of their own, in-house developed, network element managers. Such an approach provides uniformity between network element managers employed by the telecommunications company, but is disadvantageous in that it removes the vendor designed network element managers (which are particularly designed for managing the SCPs with which they are sold) from the system.

As the telecommunications industry has advanced and new user-defined services have become available (e.g., screening calls from user defined numbers, etc.), it has become more and more desirable to provide users with ready access to their subscription service data. Due to the proliferation of personal computers, the internet has become a significant vehicle for such access. However, although the services which permit a user to change its subscription package and/or to modify the parameters of the services within the package via personal computer or touch tone phone are gaining popularity, these services can be confusing to modify because they provide users with little or no information concerning the status of requested service changes until such services are actually implemented by the AIN system. For example, if a user has requested that a call screening service be modified to exclude phone calls from the 312 and the 202 area codes as of the following Monday, until Monday arrives the user typically has no way of knowing what its service package will consist of on that day unless it keeps a written record and/or remembers its instructions to the system. Thus, in this example, if the user decides to make further changes to the subject service prior to Monday, the user may encounter confusion as to the status of the user defined service.

DESCRIPTION OF THE PREFERRED EMBODIMENTS

Figure 1:
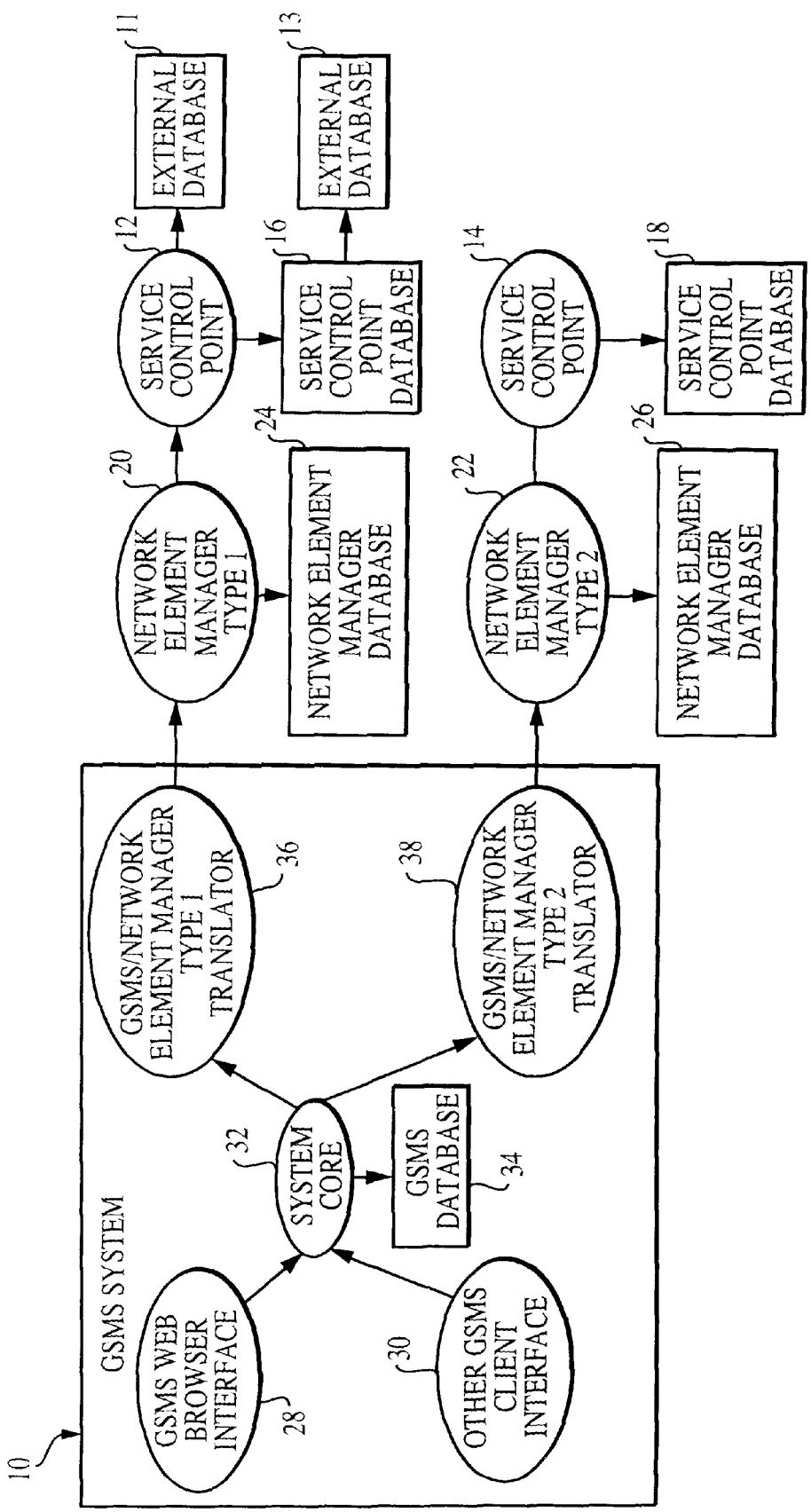
FIG. 1 is a schematic illustration of a global service management system constructed in accordance with the teachings of the instant invention and shown in a preferred environment of use.

A global service management system (GSMS) 10 constructed in accordance with the teachings of the invention is schematically illustrated in FIG. 1. As shown in that figure, the system 10 is adapted for use with one or more service control points 12, 14, each of which has an associated internal database 16, 18 and each of which has access to an associated external database 11, 13. Although more than two service control points will typically be serviced by the global service management system 10, for clarity of explanation only two such devices are shown in FIG. 1.

Although the global service management system 10 can be utilized with advanced intelligent networks (AINs) employing only one type of service control point (SCP) without departing from the scope of the invention, it will typically be used with networks employing SCPs of different types. Thus, in the example shown in FIG. 1, SCP 12 and SCP 14 are different units (possibly purchased from different vendors such as Ericsson and Lucent). As a result, although each SCP 12, 14 is respectively provided with a network element manager 20, 22, the network element managers 20, 22 operate under different protocols and, thus, cannot communicate with one another and cannot process commands or data formatted for each other. As shown in FIG. 1, each network element manager typically includes a database 24, 26.

The global service management system 10 provides a simplified interface for communicating update request messages or service request orders to the network element managers 20, 22 despite their protocol differences. As used herein, the terms "service request order" and "update request message" are synonymous and refer to an instruction to modify the data stored in one or more of the SCPs 12, 14. By way of example, not limitation, requests to add a new subscriber; to delete a subscriber; to subscribe to a service; to stop subscribing to a service; and to specify or modify parameters for a subscribed to service (e.g., block calls from area code 555) are all "update request messages".

To achieve the above-noted simplifications, the system 10 is provided with one or more input devices 28, 30 for receiving update request messages. As shown in FIG. 1, these input devices 28, 30 may be implemented in many ways without departing from the scope of the invention. For example, they may be implemented to receive messages via the internet, via an audio response unit for touch-tone phone communication, or via an automated provisioning system present at a telecommunications company such as the Legacy provisioning system which is commercially available from Bell Communications Research (Bellcore) under the product name Service Order Administration and Control (SOAC). Since the input devices can be implemented in various manners, the system 10 is preferably adapted to process messages developed under protocols different from the protocols utilized by the element managers 20,22.

In addition to the input devices 28, 30, the global service management system 10 is provided with a system core 32, a system database 34, and a number of translators 36, 38. The system core 32 is preferably implemented by one or more computers which, upon receiving an update request message via an input device, are programmed to identify one or more of the SCPs 12, 14 as a destination for the message. Upon making that identification, the update request message is passed to one or more of the translators 36, 38 where it is parsed and translated into format(s) which are understandable by the network element manager(s) 20, 22 in question.

For example, when the system core 32 identifies the destination of an update request message received by one of the input devices 28, 30 as SCP 14, it processes and delivers the message to translator 38 which translates the update request message from its initial protocol and format into a protocol and format understandable by element manager 22. Were the system core 32 to identify a received update request message as intended for SCP 12, it would process and deliver the message to translator 36 which would subsequently translate the message into a format and protocol which is understandable to network element manager 20. In instances where an update request message requires changes to more than one SCP 12, 14, the core system 32 routes the message to the corresponding translators where it is translated into the formats needed for use by the relevant network element managers (e.g., both element managers 20 and 22 in the example shown in FIG. 1).

Advantageously, the global service management system 10 cooperates with the network element managers 20, 22 without requiring modifications thereto. The global service management system 10 does not attempt to usurp the function of controlling or managing the SCPs 12, 14 from the element managers 20, 22. As a result, the element managers 20,22 manage their associated SCPs 12, 14 as they were designed to do, and the optimization achieved by the element mangers 20,22 is not interfered with by the system 10.

Figure 2:
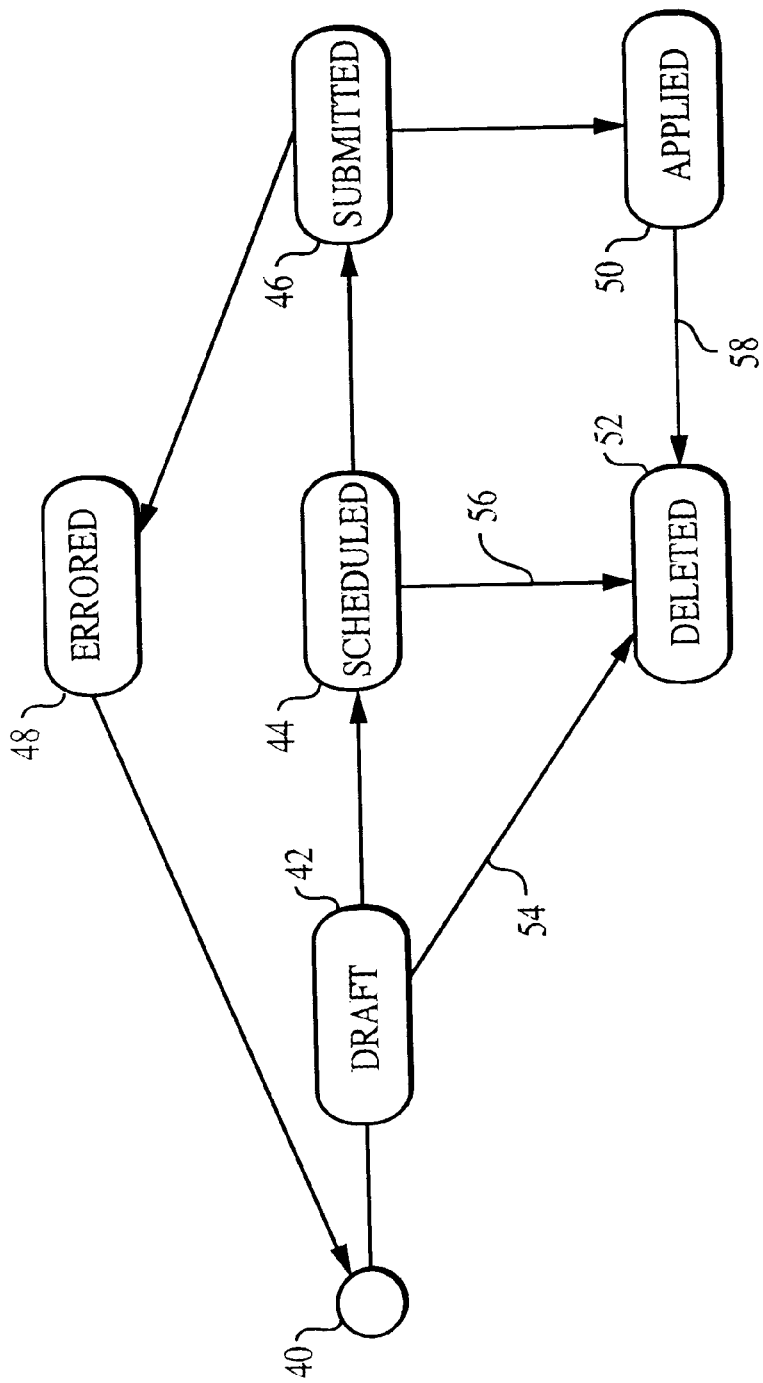
FIG. 2 is a state transition diagram schematically illustrating the overall operation of the system of FIG. 1.

A state transition diagram outlining the general processing of an update request message by the global service management system 10 of FIG. 1 is shown in FIG. 2. After a user creates the update request message (block 40) and inputs it into the system (e.g., via the internet, via an audio response unit, by speaking with provisioning personnel at the telecommunications company, etc.), the service request message is stored in a standard representation format in the system memory 34 by the core system 32 (block 42). The standard representation format comprises a number of predefined data fields. Since the data input by the user (i.e., the update request message) is preferably input in response to pre-defined questions, the data is easily and automatically partitioned into the predefined data fields.

The core system 32 then process the update request message as explained in further detail below and schedules the processed message for application to the SCP(s) 12, 14 at a future time and date (block 44). This time and date can optionally be specified by the user in the update request message. Alternatively, it can be scheduled for application after a predefined time period or by placing it into a first in, first out type queue of messages to be applied to the SCP databases 16, 18.

When the scheduled time arrives, the core system 32 delivers the processed update request message to the appropriate translator(s) 36, 38. The translator(s) 36, 38 translate the processed update request message and deliver it to their respective network element manager 20,22 (block 46). The network element manager(s) 20, 22 then process the translated update request message pursuant to their vendor specific protocols. In the event a translated message is defective in some manner (for example, not all required information was originally entered at block 42), the element manager(s) 20,22 send an error message to the global service management system 10 (block 48). The error message(s) from the element manager(s) are translated into a standard format by the interfacing translators 36, 38. The global service management system 10 then notifies the user of the error either automatically (e.g., over the internet, via pre-recorded message over the telephone) or manually (e.g., via a call from provisioning personnel). The error notification method utilized may optionally be the same as the input method used by the user at block 40.

Regardless of the error notification method utilized, if the user modifies its update request message, the process begins again at block 42.

If the element manager 20, 22 does not error the translated request message, it applies the update request message to its corresponding SCP 12, 14 (block 50) thereby updating the SCP database 16, 18 as needed.

As shown in FIG. 2, if a user withdraws an update request message before it is applied to the SCP 12, 14, the message is deleted by the core system 32 (block 52). This deletion can occur before (flowline 54) or after (flowline 56) the message is scheduled (block 44). As also shown in FIG. 2, in some instances, data is deleted after it has been applied to the SCP databases 16, 18 (flowline 58). Such deletions can occur for a large variety of reasons including, by way of example, not limitation, cancellation of a subscription, and cancellation of a service. Such deletions can be initiated through the global service management system 10 via an update request message.

In the preferred embodiment, the global service management system 10 is implemented pursuant to well known object oriented programming techniques. Object oriented programming is a programming technique wherein the computer program in question is broken up into functional blocks referred to as "objects". These objects are decoupled such that the programmed steps of any object can be modified without requiring modification of the programmed steps of any other object in the program. Such decoupling facilitates ease of modification of the program as the need arises.

An object typically contains attributes and methods. Attributes are the data contained in an object, usually organized in predefined data fields. As their names suggest, methods are routines of programmed steps. Typically, the methods contained in the object do not physically include the programmed routines. Instead, the objects usually include pathnames specifying the location of the methods associated with the object. This approach avoids storing redundant code thereby preserving system resources.

The objects are organized into classes. A class defines the general format of its associated objects. In this sense, a class can be thought of as a template for the objects it contains and each object can be thought of as an instance of the class. The class is a separate data structure outlining the format of data fields and methods that every object in the class will include. Each class may include an extra attribute or data field not present in its associated objects. This attribute reflects the number of objects (i.e., instances of the class) present at any given time.

Figure 3:
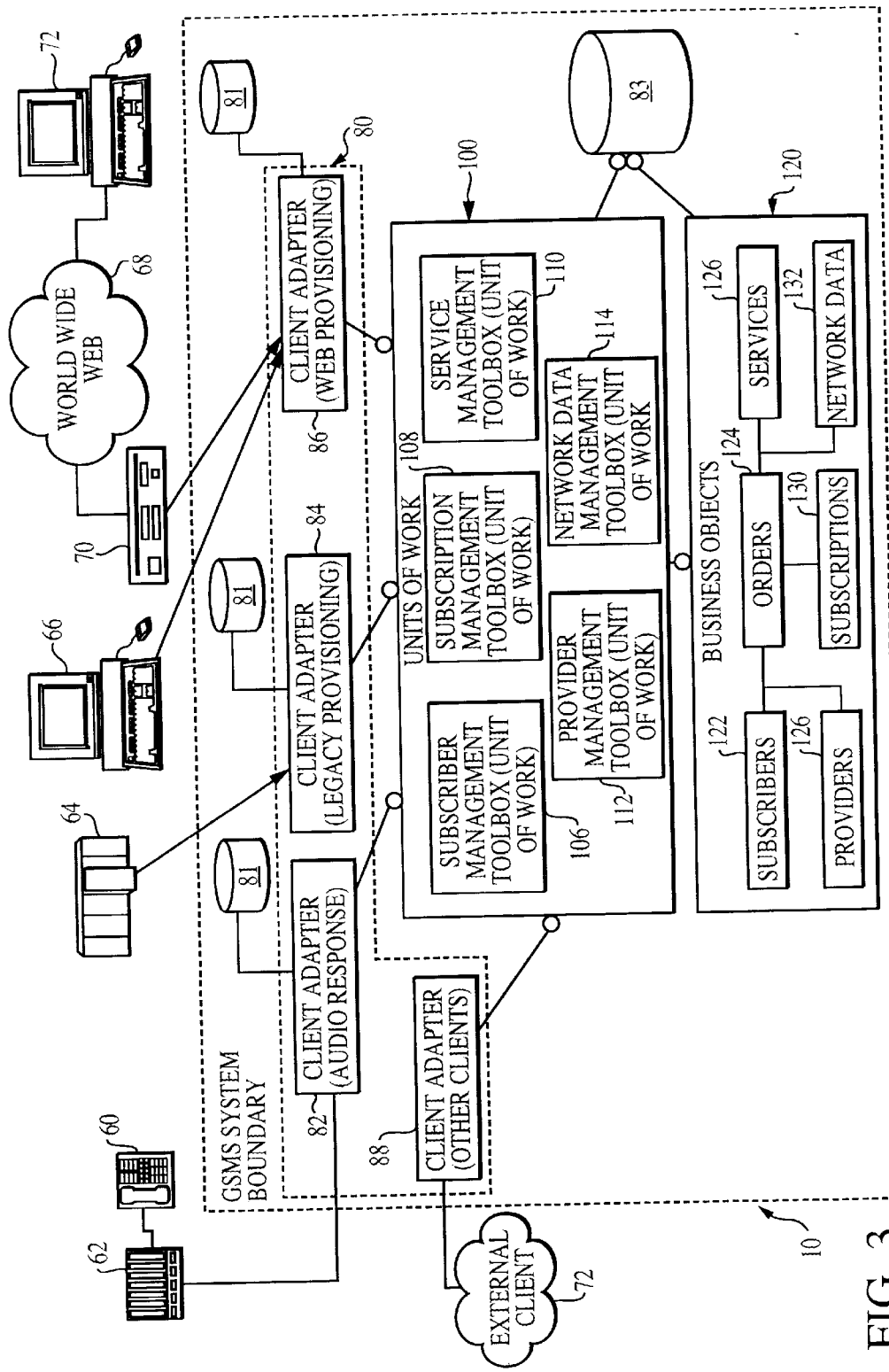
FIG. 3 is a more detailed schematic illustration of the system of FIG. 1 showing the system components which may be involved in receiving service request messages from external devices.
Figure 4:
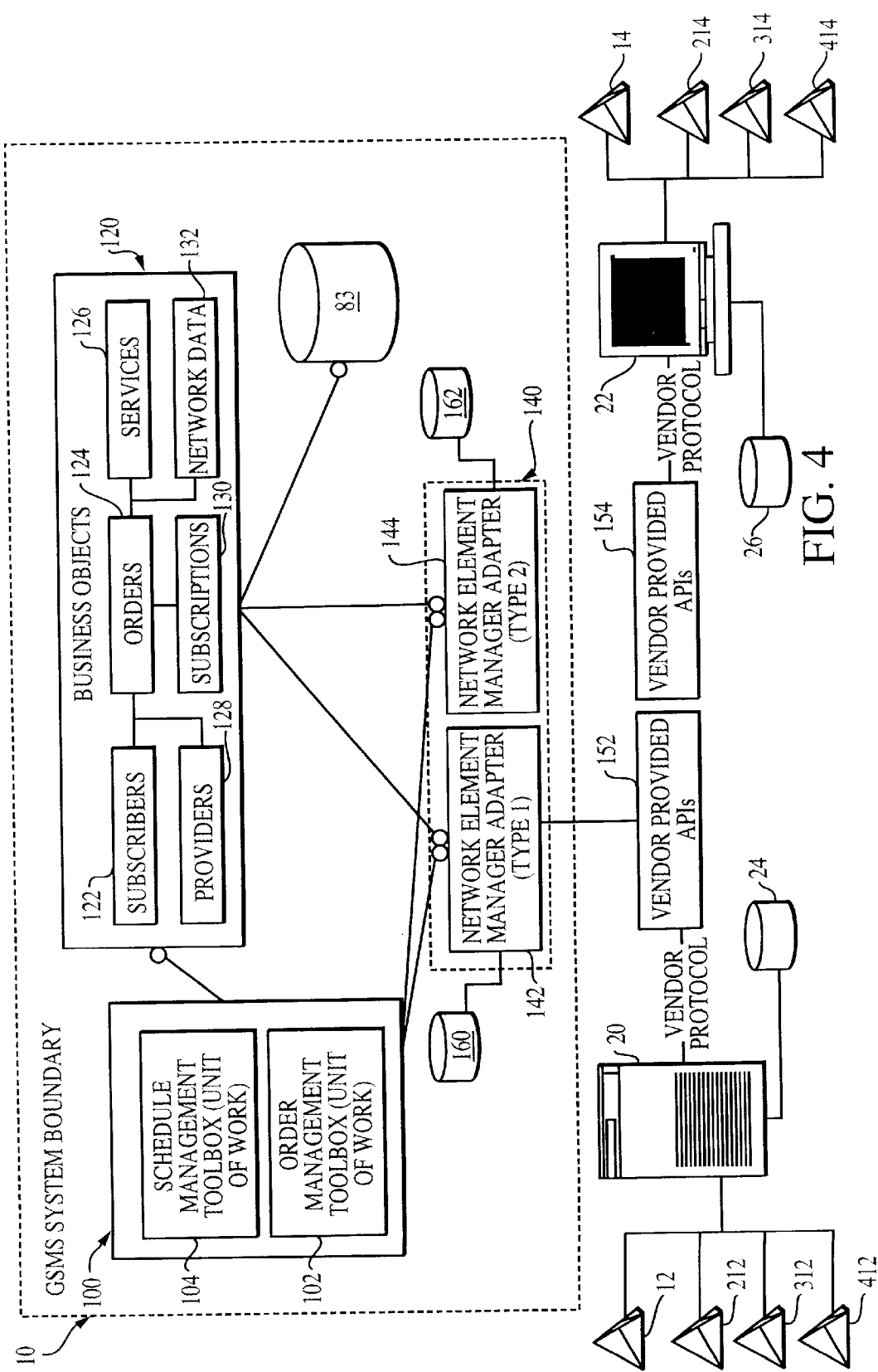
FIG. 4 is an illustration similar to FIG. 3 but showing the system components which may be involved in updating the service control point databases.

A more detailed schematic illustration of the preferred embodiment of the global service management system 10 is shown in FIGS. 3–4. For clarity of illustration, some of the components of the system 10 shown in FIG. 3 are not shown in FIG. 4 and vice versa. Instead, the system components typically associated with communicating with external devices, and/or performing initial processing of update request messages are illustrated in FIG. 3, and the system components typically associated with delivering update request messages to SCPs are shown in FIG. 4. Thus, although the global service management system 10 appears differently in FIGS. 3 and 4, the same system 10 is depicted in both of those figures.

Turning to FIG. 3, it can be seen that the global service management system 10 is preferably adapted to communicate with many different types of external devices. For example, the system 10 includes a message receiver for receiving update request messages from a subscriber operating a touch tone telephone 60 via a conventional audio response unit 62. Preferably, the audio response unit 62 is programmed to identify the type of action the user wishes to perform (e.g., add a new subscription, cancel a service, modify existing service data, etc.) via a menu driven interface. The audio response unit 62 is also adapted to request predefined information associated with the type of action the user wishes to perform. This information, which is, again, preferably developed via a menu driven interface, is utilized by the response unit 62 to develop an update request message which is forwarded to the global service management system 10 in conventional ARU format.

By way of another example, the system 10 also includes a message receiver for receiving update request messages from an automated provisioning system 64 such as the Legacy system which is commercially available from Bell Communications Research (Bellcore) under the product name Service Order Administration and Control (SOAC). Update request messages developed via the Legacy provisioning system 64 are delivered into the system in Legacy provisioning format.

As shown in FIG. 3, update request messages can also be delivered to a message receiver of the system 10 via an internal provisioning computer 66 operated by the provisioning personnel of a telecommunications company. Such a computer 66 is typically implemented by one or more personal computers (PC) operated at the facility of the telecommunications company and networked to the system 10 via a local area network. Usually, messages delivered to the system 10 via this avenue are developed by personnel of the telecommunications company questioning a customer over the phone and inputting data into the PC 66. To this end, the PC 66 is preferably provided with menu driven interface software that responds to an identification of the type of action the user wishes to undertake, and requests predefined information associated with that action. The interface software utilizes this data to develop and forward an update request message to the system 10. Preferably, the update request message is forwarded to the system 10 in accordance with the CORBA IIOP protocol (Common Object Request Broker Architecture Internet Inter Orb Protocol).

Preferably, the global service management system 10 is also provided with a message receiver for receiving update request messages via the internet 68 as shown schematically in FIG. 3. To this end, the telecommunications company preferably provides a web page via a gateway server 70 that provides visiting users with a menu driven interface for developing update request messages. The menu driven interface may optionally be identical to the interface provided for internal provisioning PC 66. Preferably, the interface requests a user operating an external PC 72 to identify the type of action desired, and then requests predefined information associated with the identified action. The input data is formatted into an update request message which is forwarded to the system 10; preferably pursuant to the CORBA IIOP protocol which is used for intra-system communications.

Other options for delivering update request messages are also possible. For example, external clients 72 may deliver update request messages via e-mail.

As shown in FIGS. 3 and 4, the objects included in the preferred embodiment of the global service management system 10 can be grouped into four categories, namely, client adapters 80, units of work or toolboxes 100, business objects 120, and network element adaptor objects 140. The communications between these objects and groups of objects are preferably conducted via the CORBA IIOP protocol as shown in FIGS. 3 and 4.

Generally speaking, client adaptor objects 80 are the message receivers responsible for understanding update request messages received from external systems and/or users of the system 10 via the various input possibilities (60–72) discussed above. More specifically, they are responsible for translating the received update request messages into actions to be performed via the business objects 120, the units of work objects 100, and, in some instances, the network element adapter objects 140. To this end, the client adapter objects 80 are preferably provided with access to translation information databases 81, which may optionally be implemented as portions of the system database 83. The message receivers also comprise oversight controllers for order creation as explained below. As shown in FIG. 3, the client adapter objects 80 include audio response receiver objects 82, automatic provisioning message receiver objects 84, network provisioning receiver objects 86, an one or more other objects 88 for receiving update request messages via one or more other input avenues not serviced by objects 82, 84, 86.

The business objects 120 comprise primary controllers for processing update request messages requesting system modifications or actions relating to a predetermined business function. They are independent objects that provide the core business model for the global service management system 10. The business objects contain information about entities for which the system 10 provides support. They also include routines or methods for updating and retrieving information stored in the system database 83 and/or for collaborating with the element manager adapters 140 for updating and/or retrieving information stored in the SCP databases. Preferably, the business objects are de-coupled from system level functionality, and are responsible for a unique business aspect of the system 10. As shown in FIGS. 3 and 4, the business objects include: subscriber objects 122, order objects 124, services objects 126, providers objects 128, subscriptions objects 130, and network data objects 132. Each of these objects are described further below.

The units of work objects 100 (also known as toolbox objects) each comprise system flow controllers interfacing with the message receivers 80 and with one or more of the primary controllers/business objects 120 to process update request messages received by the message receivers 80. They are responsible for managing the business objects 120 and controlling the flow of system control as an update request message is processed through the system 10. More specifically, they are responsible for operations that do not logically belong to any particular business object 120. For example, creating an order to change subscriber information in response to an update request message would involve at least an order object 124 and a subscriber object 122. The operations regarding co-operation between these two objects 122, 124 do not logically belong to either object 122, 124, so they are placed in the order management toolbox 102 (see FIG. 4).

The toolbox objects 100 provide interfaces to and between business objects 120. They reduce the number of required network connections and provide a stable interface for the system 10 which is much less complex than would otherwise be required in their absence. The toolbox objects 100 can be built with general method calls using normal parameters or they can use one or more composite messages. Composite messages are advantageous in that they support transfers of large streams of tagged values and are formatted in compliance with CORBA standards. The units of work objects 100 preferably include order management toolbox objects 102, schedule management toolbox objects 104, subscriber management toolbox objects 106, subscription management toolbox objects 108, service management toolbox objects 110, provider management toolbox objects 112, and network data management toolbox objects 114. Each of these toolbox objects 102–114 is discussed in further detail below.

Each of the network element manager adapter objects 140 comprises a translator for translating update request messages into a format usable by one or more network element managers 20, 22 associated with one or more SCP 12, 14, 212, 214, 312, 314, 412, 414 (see FIG. 4). These objects 140 are responsible for managing the translation of update request messages processed by the business objects 120 and toolbox objects 100 into the protocol or format required by an associated network element manager 20, 22. They are also responsible for the reverse process, namely, translating messages from its associated element manager 20, 22 to a format or protocol which is understandable by the business objects 120 and toolbox objects 100. Preferably, a network element manager adapter object 142, 144 is provided for each type of element manager 20, 22 serviced by the system 10. As shown in FIG. 4, each network element manager adapter object 142, 144 cooperates with a vendor provided API (Application Programmatic Interface), a library of vendor routines which facilitate communication with the network element managers 152, 154.

Each of the above-noted object classes will now be described in further detail. Turning first to the client adaptor objects 80, the objects 82 in the audio response receiver class are responsible for receiving update request messages from audio response units and translating them from the ARU format into a format usable by the other objects of the system 10. To this end, the objects 82 in the audio response receiver class are adapted to respond to user inputs to the audio response units by cooperating with other objects in the system to verify user identification information, by cooperating with appropriate objects in the system to retrieve data relating to the identified user's subscription services package, and by cooperating with the necessary objects in the system to effect modification of the retrieved data by the users communicating with the audio response units.

The objects 84 in the automatic provisioning receiver class are responsible for receiving update request messages from an automatic provisioning system 64, and for translating these messages into a format usable by the other objects of the system 10. In addition, the objects 84 in the automatic provisioning receiver class are capable of recording requests to add or delete services from subscription packages, to acknowledge that the requested service modification(s) (be they adding a service to a subscription package or deleting a service from a subscription package) have been scheduled, and to deliver the requested service modification(s) to the appropriate objects for implementing the change(s).

The objects 86 in the network provisioning receiver class are responsible for receiving update request messages from networked provisioning systems (66–72) and for translating such messages to a format usable by the other objects of the system 10. The network provisioning receiver objects 86 preferably include the following attributes: (a) specific business object(s) (120); (b) specific change(s) to those business object(s)(120); and (c) specific time(s) to apply change(s) to those object(s) (120). Each network provisioning receiver object 86 can also preferably perform the following methods: (1) creating a business object; (2) retrieving a business object; and (3) viewing a business object (120).

Objects 88 are similarly tailored to the types of external messaging they are intended to service.

Turning to the business objects 120, the objects 122 in the subscriber class are responsible for identifying all of the subscribers to the advanced intelligent network serviced by the global service management system 10 and the services those subscribers subscribe to. To this end, every instance of the subscriber class (i.e., every subscriber object 122) preferably has the following attributes: (a) subscriber name; (b) contact information (e.g., a name of a person responsible for the subscriber, a billing address, and a telephone number); and (c) a list of the services to which the subscriber subscribes. Every subscriber object 122 is also preferably capable of performing the following methods (i.e., calling the following routines) (1) creating a new subscriber; (2) changing any attribute of the subject subscriber object 122; and (3) retrieving any of the attributes of the subject subscriber object 122 from the system database 83 and/or one of the SCP databases by using a network element manager adapter object 140.

The objects 124 in the order class are responsible for forming an "order" from an update request message. The order typically forms an association between a collection of changes to the state of the serviced network as requested in an update request message, but it could also include only one such change. Every change contained in an order is applied by the system 10 beginning at the same time. When this occurs, the order is said to be applied.

Each order object 124 includes the following attributes: (a) a list of order sections; (b) an identification of the creator of the order; (c) a due date specifying when the order is to be applied; (d) an identification of the status of the order (e.g., stored, scheduled, in error, applied, deleted); (e) notification information (i.e., who, if anyone, to notify when the order changes state, and how (e.g., via the internet, via a pre-recorded message, etc.)); (f) a list of any orders the associated order depends upon (i.e., any orders that must be applied before the instant order can be applied); and (g) a list of orders that depend on this order. With respect to attribute (a) above, the order is broken down into sections which group changes in the order into logical subunits. For example, every subscriber that will experience changes due to the order has its own section, as does the service provider from which the subscriber purchased services. The changes in a section consist of references to the new versions of business objects associated with the entities the order is changing.

Each order object 124 is also capable of performing the following methods (i.e., calling the following routines): (1) scheduling an order; (2) de-scheduling an order; (3) deleting an order; (4) applying an order; (5) editing an order; (6) retrieving dependent orders; (7) retrieving orders on which the instant order depends; and (8) validating an order.

The objects 126 in the services class are each responsible for tracking a service subscribed to by a subscriber and for modifying the attribute(s) of that service in accordance with subscriber requests. Each service object 126 preferably includes the following attributes: (a) the name of the service; (b) an identification of the current service attributes (the number and type of these attributes vary by service); (c) an identification of the subscriber(s) to the service; and (d) an identification of the telephone number(s) of the subscriber(s) identified in attribute (c). The identification in attribute (c) does not list every subscriber in the world who subscribes to the service in question. Instead, a service object 126 is developed and stored for each subscriber (for example, XYZ Corporation) and for each service the subscriber subscribes to. For example, if XYZ Corporation subscribes to three services, three separate service objects 126 would be developed and stored by the system 10, one object for each of the services XYZ Corporation subscribes to. In such an instance, XYZ Corporation would likely be the only subscriber identified in attribute (a). If TZ Partnership subscribes to the same three services as XYZ Corporation, three additional service objects 126 would be created by the system 10 for TZ Partnership.

Each of the service objects 126 can perform the following methods: (1) change name; (2) change service attribute; and (3) add/modify/delete subscribing numbers. With respect to method (2) above, the ability to change one or more service attributes (e.g., by adding, deleting, or modifying the attribute(s)), varies by service.

The objects 128 of the service provider class are responsible for tracking use of the serviced advanced intelligent network by rival telecommunication companies and for billing those rivals for services used. This class is required because under current U.S. law, rival telecommunication companies must often be permitted to utilize an RBOC's system and resources in order to market access to those resources to telecommunication customers. Each of the service provider objects 128 includes the following attributes: (a) the service provider name; (b) an identification of a designated contact person or position at the service provider identified in attribute (a), (preferably including a mailing address, telephone number, and e-mail address); (c) billing information (preferably including a mailing address, telephone number, and e-mail address); and (d) a list of valid services which customers may subscribe to through the provider identified in attribute (a).

Each service provider object 128 can also preferably perform the following methods: (1) create a new service provider object 128; (2) modify the provider name in attribute (a) above; (3) add or modify the contact information in attribute (b) above; (4) add or modify the billing information in attribute (c) above; and (5) add, delete, or modify valid services in attribute (d) above.

The objects 130 in the subscription class are each responsible for managing a subscription package of service(s) a given subscriber subscribes to. Each subscription object has the following attributes: (a) a list of telephone numbers associated with the subject subscription package; (b) an identification of the subscriber owning the subscription package; (c) a list of the services subscribed to by the subscriber; (d) an identification of billing information; (e) parameters that can be used by several services such as user Personal Identification Number(s) (PIN); and (f) a map or table identifying the association(s) between the subscribing number(s) identified in attribute (a), and the service(s) identified in attribute (c). Each object 130 is also capable of performing the following methods: (1) creating a new subscription object 130; (2) adding/removing a service to/from attribute (c); (3) modifying or adding the billing information in attribute (d) above; (4) retrieving billing information from the system database 83 or from the SCP databases; (5) modifying or adding multi-service parameters (e.g., a PIN) to attribute (e) above; (6) adding/removing subscribing numbers to/from attribute (a) above; and (7) changing the association(s) (specified in attribute (f)) between the subscribing numbers and their services (i.e., what services a particular number identified in attribute (a) utilizes).

The network data objects 132 are responsible for managing the network data maintained on the system 10 in the system database 83. They may optionally be used to manage reference information on the network element mangers 20, 22. There are different subsets of reference information which can be so managed including: routing plans (containing routing logic and associated data), and NPA-NXX tables. Network data objects 132 can preferably perform the following methods: (1) adding a new NXX; (2) splitting an NPA; (3) adding, deleting or modifying an SCP; and adding, deleting or modifying an SCP group.

The objects 102 in the order management toolbox class are responsible for storing (and retrieving) orders in (and from) the system database 83. Each order management toolbox object 102 includes one attribute, namely, a list of stored orders. The list is preferably indexed by various attributes including due date, creator, subscriber, and/or subscribing number. Each order management toolbox object 102 may also perform the following methods: (1) create and store an order on the system database 83; and (2) retrieve an order from the system database 83. The order management toolbox object 102 creates an order by requesting a new instance of an order object 124 and thereafter requesting the new order object 124 to update its attributes using the methods contained in that object 124.

The objects 104 in the schedule management toolbox class are responsible for notifying other objects in the system when a particular date and time arrives. In other words, these objects 104 maintain the system schedule. Typically, the schedule management toolbox objects 104 receive requests from other objects to schedule an event, and notify the requesting object (and, in some instances, other objects) when the specified time and date arrives.

The attributes of the schedule management toolbox objects 104 include a list of scheduled events and the particular dates and times they are to occur. These events may include orders to be processed, measurements to be taken, and/or reports to be generated. Each schedule management toolbox object 104 also includes the following methods: (1) adding a new event to the schedule; (2) removing a scheduled event; and (3) rescheduling an event.

The objects 106 in the subscriber management toolbox class are responsible for updating (sometimes by creating one or more new objects) the business objects 120 when a new subscriber is added to the system; when an old subscriber is deleted from the system 10; or when modifications are made to information in existing subscriber objects 122. The subscriber management toolbox objects 106, like all of the other toolbox objects 100, do not have any attributes. The subscriber management toolbox objects 106 are preferably adapted to perform the following methods: (1) creating a new subscription; (2) deleting an existing subscriber; and (3) modifying information in an existing subscriber object.

Method (1) of the subscriber management toolbox object 106 is typically performed when an update request message requesting that a new subscriber be added to one or more of the SCPs 12, 14, 212, 214, 312, 314, 412, 414 is received. After the order management toolbox object 102 creates an order to effect this change, it contacts the schedule management toolbox object 104 to schedule a time for applying the order to the SCP database(s), and sends a request to the subscriber management toolbox object 106 for a new subscriber object. In response to such a request, a new instance 106 of the subscriber management toolbox class is created for managing the addition of the new subscriber. To perform method (1), the subscriber management toolbox object 106 then requests a subscriber object 122 to utilize its methods to create a new instance of a subscriber object 122, and thereafter communicates with the new subscriber object 122 to fill in the attributes of the new object 122 by causing new subscriber object 122 to perform its methods (e.g., changing its attributes with data from the update request message requesting a new subscriber, and/or retrieving any needed attribute from the system database 83 and/or the SCP databases). Once the new subscriber object 122 is completed, the subscriber management toolbox object 106 proceeds with method (1) to note the presence of the new subscriber object 122 in the system directories stored in database 83 so that the new object 122 can be located later. It also creates any required associations with other business objects 120 (such as a services object 126, an order object 124 and/or a subscription object 130) by contacting the toolbox object(s) associated with the effected object(s) and requesting it to modify the attribute(s) accordingly.

Similarly, to perform method (2), namely, deleting an existing subscriber, the subscriber management toolbox object 106 deletes the appropriate subscriber objects 122 from the system database 83, removes that object 122 from the system directories in the database 83, and communicates with the appropriate toolbox objects 100 associated with the relevant business objects 120 to remove any associations with the deleted subscriber object 122 from their attributes and, in some instances, to delete business objects 120 that are no longer needed because of the removal of the subscriber.

Finally, the subscriber management toolbox object 106 performs method (3) above, namely, modifying information in an existing subscriber object 122, by communicating with the effected subscriber object 122 to cause that object 122 to modify itself via the method(s) it contains.

The objects 108 in the subscription management toolbox class are responsible for updating (sometimes by creating one or more new objects) the business objects 120 when a new subscription is added to the system 10; an old subscription is deleted; or when modifications are made to an existing subscription. The subscription management toolbox objects 108 do not have any attributes. They are, however, capable of performing the following methods: (1) creating a new subscription; (2) deleting an existing subscription; and (3) modifying information in existing subscription objects 130. Method (3) is performed by the subscription management toolbox 108 by communicating with the effected subscriber object 130 to cause that object 130 to modify its attributes via the methods it contains.

Like the subscriber management toolbox objects 106, a new instance 108 of the subscription management toolbox class is created in response to a request from an order management toolbox object 102 (which was itself created in response to an update request message requesting the creation of a new subscription and possibly other changes). The subscription management toolbox object 106 then requests an existing subscription object 130 to create a new subscription object 130. The toolbox object 106 then requests the new subscription object 130 to update its attributes with the information received from the update request message. After the new subscription object 130 is completed, the subscription management toolbox object 108 proceeds with method (1) to note the presence of the new subscription object 130 in the system directories stored in database 83 to facilitate locating the new object 130 in the future. It also creates any required associations with other business object(s) 120 by requesting the appropriate toolbox objects 100 to instruct the effected object(s) to modify their attributes accordingly.

Similarly, in deleting an existing subscription (method (2)), the subscription management toolbox object 108 deletes the appropriate subscription object 130 from the system database 83; removes that object 130 from the system directories, and communicates with the appropriate toolbox objects 100 which respond by instructing their associated business objects 120 to remove any associations with the deleted object 130 from their attributes, and, in some instances, by deleting business objects 120 that are no longer needed because of the removal of the subscription object 130.

The objects 110 in the service management toolbox class are responsible for updating (sometimes by creating one or more new objects) the business objects 120 when a new service subscription is added to the system 10, an old service subscription is deleted, or when modifications are made to an existing service configuration. The service management toolbox objects 110 do not have any attributes. They are, however, capable of performing the following methods: (1) creating a new service object; (2) deleting an existing service object; and (3) modifying information in existing service objects 126. Method (3) is performed by the service management toolbox 10 by communicating with the effected service object 126 to cause that object 126 to modify its attributes via the methods it contains.

Like the subscriber management toolbox objects 106, a new instance 110 of the service management toolbox class is created in response to a request from an order management toolbox object 102 (which, in this example, was itself created in response to an update request message requesting the creation of a new service subscription). The service management toolbox object 110 then requests an existing service object 126 to create a new service object 126. The toolbox object 110 then requests the new service object 126 to update its attributes with the information received from the update request message. After the new service object 126 is completed, the service management toolbox object 110 proceeds with method (1) to note the presence of the new service object 126 in the system directories stored in database 83 to facilitate locating the new object 126 in the future. It also creates any required associations with other business object(s) 120 by requesting the toolbox objects 100 associated with the effected object(s) to instruct those object(s) to modify their attributes accordingly.

Similarly, in deleting an existing subscription (method (2)), the service management toolbox object 110 deletes the appropriate service object 126 from the system database 83, removes that object 126 from the system directories, and requests the appropriate toolbox objects 100 to instruct their associated business objects 120 to remove any associations with the deleted object 130 from their attributes, and, in some instances, to delete business objects 120 that are no longer needed because of the removal of the service object 126.

The objects 112 in the service provider management toolbox class are responsible for updating (sometimes by creating one or more new objects) the business objects 120 when a new service provider is added to the system 10, an old service provider is deleted, or when modifications are made to an existing service provider object 128. The service provider management toolbox objects 112 do not have any attributes. They are, however, capable of performing the following methods: (1) creating a new service provider object 128; (2) deleting an existing service provider object 128; and (3) modifying information in existing service provider objects 128. Method (3) is performed by the service provider management toolbox 112 by communicating with the effected service provider object 128 to cause that object 128 to modify its attributes via the methods it contains.

Like the subscriber management toolbox objects 106, a new instance 112 of the service provider management toolbox class is created in response to a request from an order management toolbox object 102 (which, in this example, was itself created in response to an update request message requesting the creation of a new service provider). The service provider management toolbox object 112 then requests an existing service provider object 128 to create a new service provider object 128. The toolbox object 112 then requests the new service provider object 128 to update its attributes with the information received from the update request message. After the new service provider object 128 is completed, the service provider management toolbox object 112 proceeds with method (1) to note the presence of the new service provider in the system directories stored in database 83 to facilitate locating the new object 128 in the future. It also creates any required associations with other business object(s) 120 by requesting the toolbox objects 100 associated with the effected object(s) to instruct those object(s) to modify their attributes accordingly.

Similarly, in deleting an existing service provider (method (2)), the service provider management toolbox object 112 deletes the appropriate service provider object 128 from the system database 83, removes that object 128 from the system directories, and requests the appropriate toolbox objects 100 to instruct their associated business objects 120 to remove any associations with the deleted object 128 from their attributes, and, in some instances, to delete business objects 120 that are no longer needed because of the removal of the service provider object 128.

The objects 114 in the network data management toolbox class do not have any attributes. Their sole responsibility is to modify the network data objects 132 as needed.

The network data management toolbox 114 supports the following methods: (1) adding a new NXX to an NPA; (2) splitting an NPA; (3) adding an SCP; (4) deleting an SCP; (5) adding an SCP group; (6) deleting an SCP group; and (7) modifying an SCP group. Method (1) creates a new NPA-NXX object and adds it to the reference table. Method (2) accepts a new NPA, the current NPA to be split, and a list of NXX codes to be migrated to the new NPA. It then searches through the system database 83 for all occurrences of telephone numbers which need to be modified. For each telephone number that needs to be modified, appropriate service-specific messages are generated to send to the element manager 20, 22 to update the information on each SCP 12, 14, 212, 214, 312, 314, 412, 414.

Method (3), namely, adding an SCP, is used to add an SCP 12, 14, 212, 214, 312, 314, 412, 414 to the system database 83. Method (4), namely, deleting an SCP, removes an SCP 12, 14, 212, 214, 312, 314, 412, 414 from the database 83. SCP groups are used for identifying target SCPs 12, 14, 212, 214, 312, 314, 412, 414 for routing plans. Adding an SCP group (method 5) creates a grouping to hold SCPs, whereas deleting an SCP group (method 6) removes the grouping from the database. Method (7), modifying an SCP group, is used to add or remove SCPs from an SCP group.

The objects 142, 144 in the network element manager adapter class 140 are responsible for translating requests to retrieve or store data from or to one or more of the SCP(s) 12, 14, 212, 214, 312, 314, 412, 414, from the format used by the system 10 into a format understandable to a particular network element manager 20, 22. They are also responsible for translating messages received from their associated network element manager 20, 22 to the format used by the global service management system 10. The attribute of each network element manager adapter object 142, 144 is a map of parameters or messages from the global service management system format ("GSMS format") to the format of the network element manager 20, 22 in question. This map is typically stored in an order translation database 160, 162 which may be implemented by a separate stand alone data store (as shown in FIG. 4), or as part of the system database 83. The order translation database 160, 162 can optionally be implemented as a look-up table.

Each network element manager adapter object 142, 144 is capable of performing the following methods: (1) retrieving network information from the element manager 20,22; and (2) translating messages from the GSMS format to the format required by the network element manager in question 20, 22 and vice versa. Method (2) is performed by addressing the order translation database 160 or 162 to identify the translated counterpart of the message in question on a piece by piece or tokenized basis in accordance with well known parsing techniques.

More specifically, as mentioned above, each order object 124 is capable of performing the method of applying itself. When an order object 124 applies itself (typically, in response to a message from the schedule management toolbox object 104 indicating that the scheduled time for application has arrived), the order object 124 identifies which of the SCP(s) 12, 14, 212, 214, 312, 314, 412, 414 it is to update and contacts the appropriate network element manager adapter object(s) 142, 144. One or more instances 142, 144 of the network element manager adapter class is then created (i.e., if more than one type of network element manager 20, 22 is to be addressed, more than one instance of the network element manager adapter class will be invoked, one for each element manager 20, 22) for translating the order. The order object 124 then parses itself into logical parts which it sequentially feeds to the network element manager object(s) 142, 144 in question along with an explanation of the identity of the part and its destination. The network element manager adaptor object(s) 142, 144 address their databases 160, 162 as needed to look up a corresponding part in the language of the appropriate network element manager 20, 22 to thereby translate the order from the GSMS format to the network element manager format on a piece by piece basis. The translated order (or part of an order) is then delivered to the appropriate network element manager 20, 22 via the vendor provided APIs 152, 154.

In the reverse direction, data returned from the network element managers 20, 22 data is formatted in accordance with the APIs 152, 154 and is delivered to the network element manger adapter object 142, 144 in question for translation into the GSMS format. The translated message is then passed from the adapter object 142, 144 to the business object 120 or toolbox object 100 which triggered the message from the network element manager 20, 22.

Figure 5A:
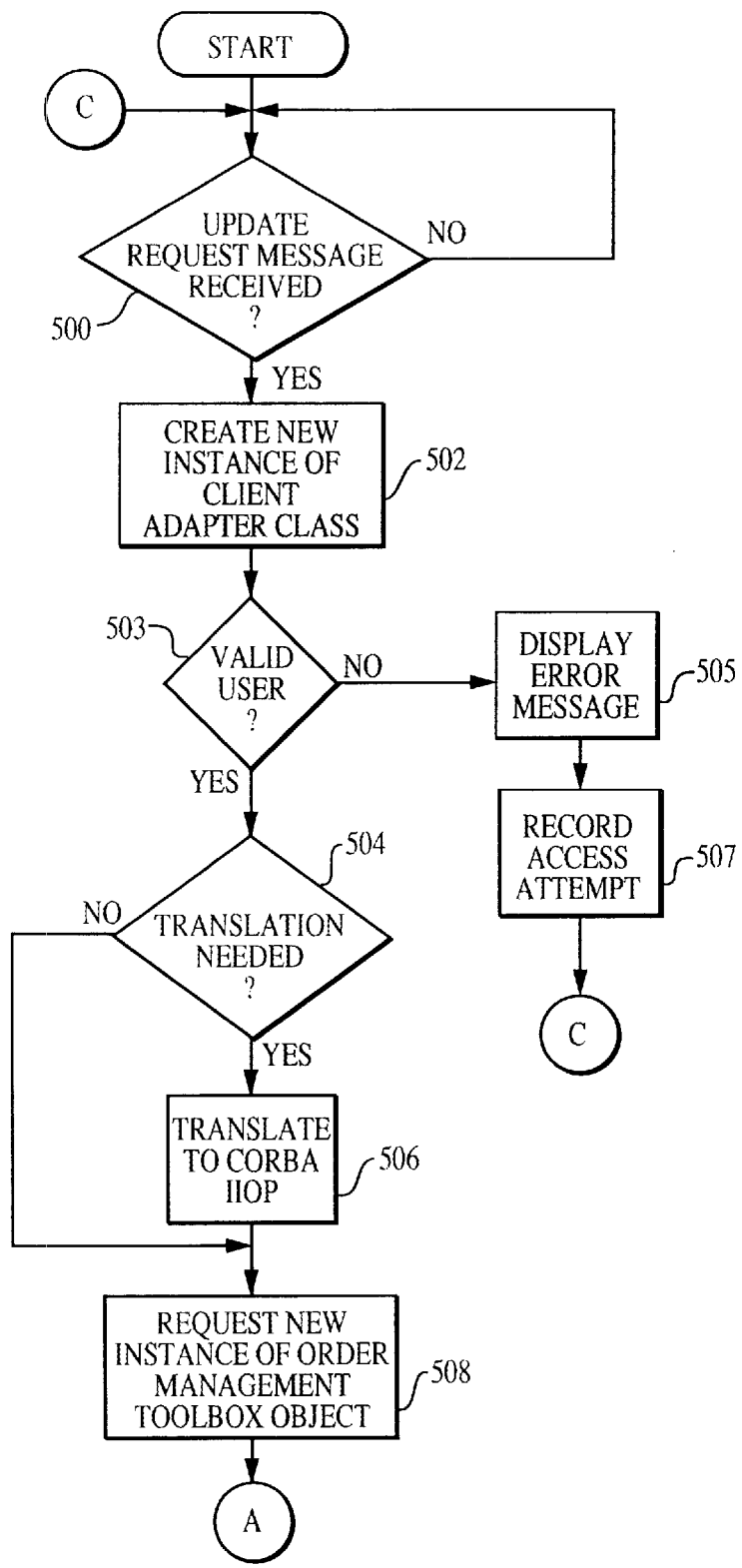
FIGS. 5A–5C are flowcharts illustrating the steps performed by the global service management system of FIG. 1 in receiving an update request message.
Figure 5B:
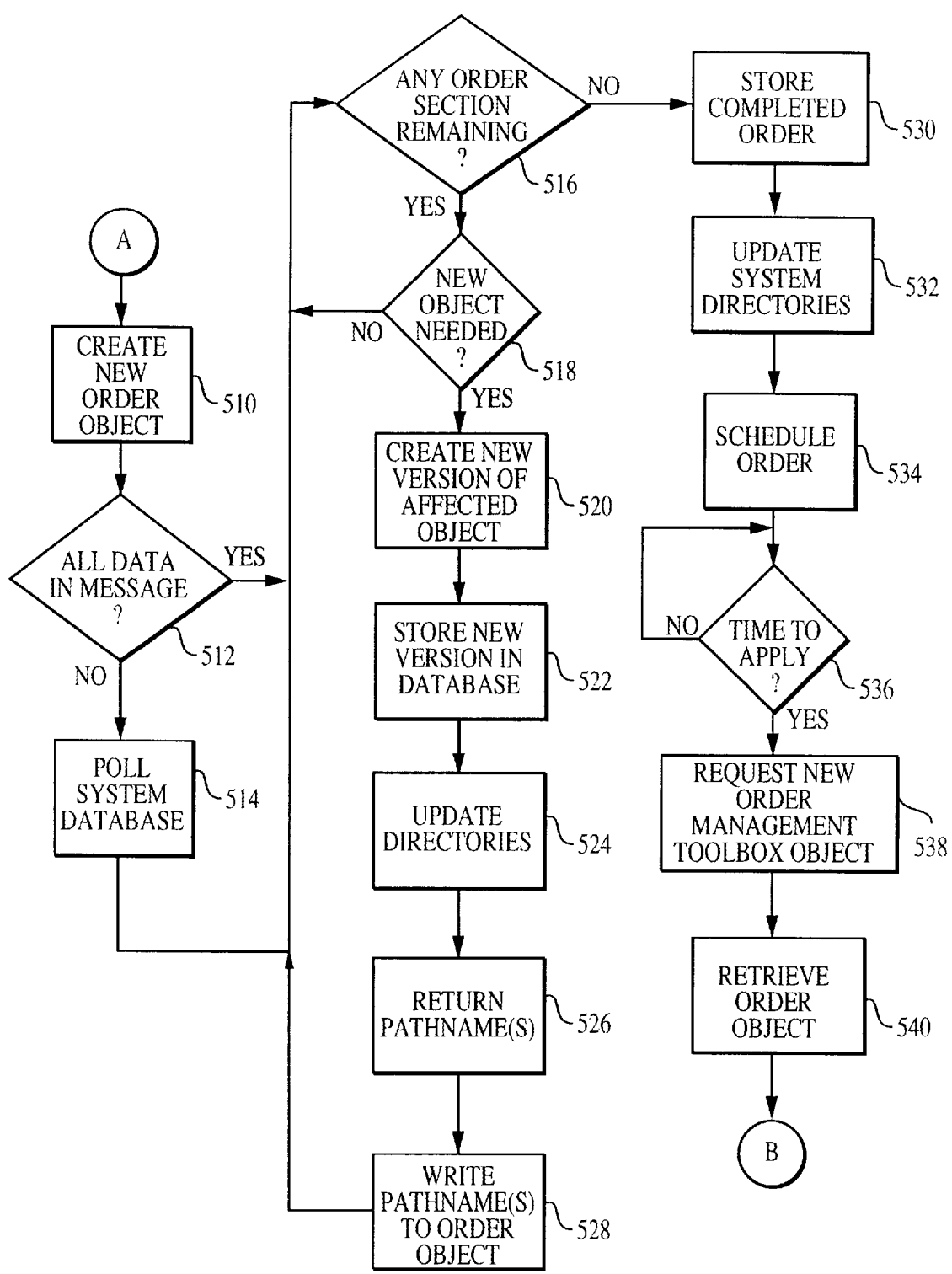
Figure 5C:
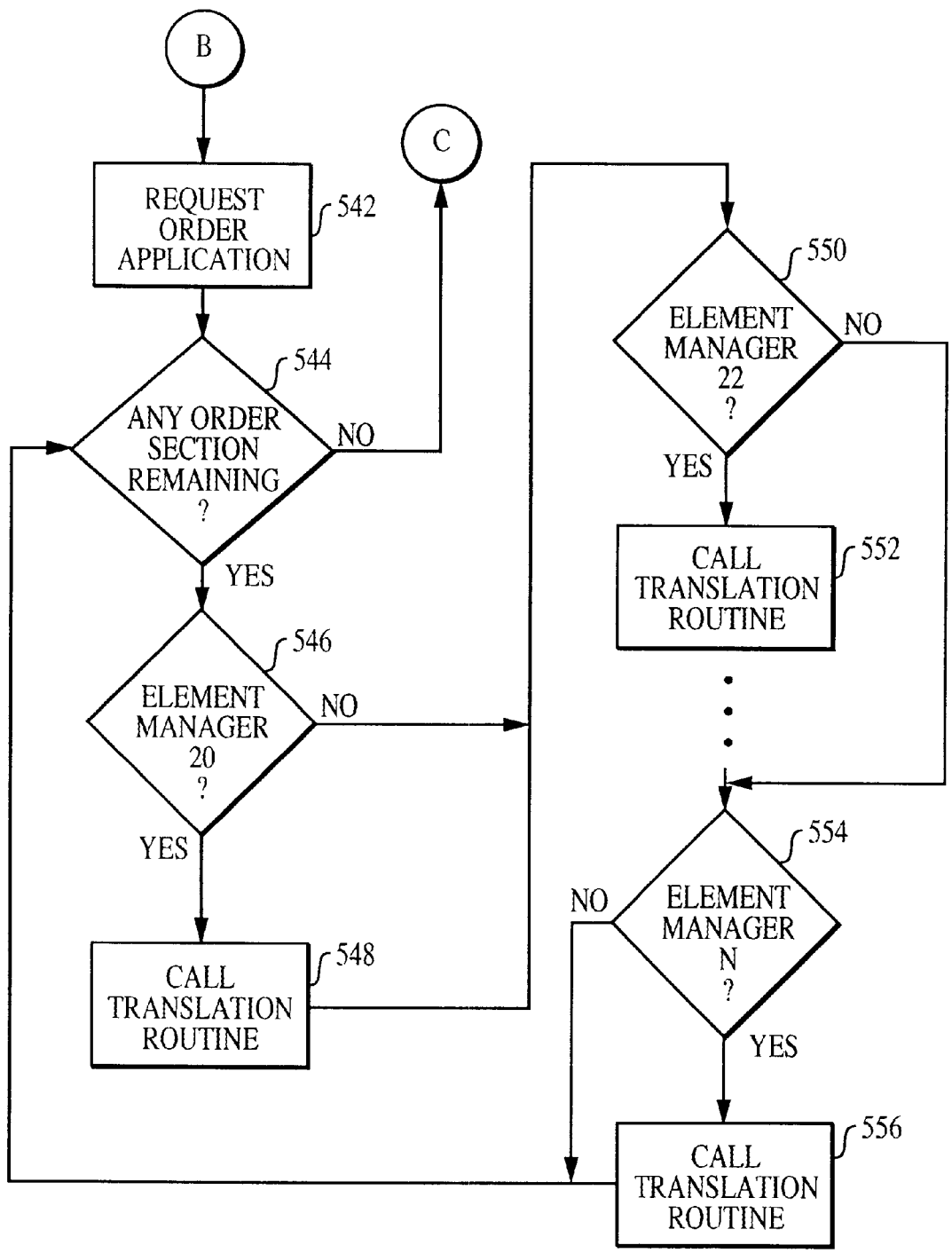

The operation of the system 10 will now be explained in connection with the flowcharts shown in FIGS. 5–8. Turning to FIG. 5, an update request message is first developed by an external system using one of the input methods shown in FIG. 3, namely, via the audio response unit 62, the automatic provisioning system 64, the internal provisioning PC 66, the internet 68, 70, or via the other external client communication options 72. Once completed, the update request message is forwarded to the global service management system 10. As shown in FIG. 5, the system 10 stands ready to process a received update request message. At block 500, the system 10 waits until a new update request message is received. Once this occurs, the system 10 creates a new instance of the client adapter class 80 (block 502) appropriate for the format of the received message (e.g., an audio response receiver object 82 is prepared if the update request message is in ARU format; a network provisioning receiver object 86 is prepared if the update request message is received via the gateway 70, etc.).

Once created, the client adapter object 80 first determines whether the user is authorized to contact the system 10 (block 503). This is preferably accomplished by comparing a name and pass code or shared secret or digital certificate entered by the user to a security database which may optionally be included in the system database 83. If the user is not a valid user (block 503), the client adapter object 80 sends an error message to the user via the input device in question (block 505), and records the attempt in a database (block 507) to facilitate detection of repeated denied attempts to access the system 10 and possible fraudulent activities.

If the user is valid (block 503), the client adapter 80 determines whether a translation is needed (block 504). If not, control passes to block 508. Otherwise, the client adapter object 80 converts the update request message into a format understandable by the other objects of the system 10 (e.g., to the CORBA IIOP protocol) (block 506). Once the update request message is translated (if needed), the client adapter object 80 requests the issuance of a new instance of the order management toolbox class (block 508). Control then passes to the new order management toolbox object 102.

The order management toolbox object 102 creates a new instance of the order business object class 124 (block 510) and fills in the attributes of that new order object 124 with the information contained in the update request message. At block 512, the order management toolbox object 102 may optionally determine whether all data needed to complete the order has been entered into the order object 124 from the update request message. If so, control passes to block 516. Otherwise, the order management toolbox object 102 may optionally retrieve any known dependent order or any order on which the current order depends (e.g., by using the methods of the order object) to complete the order object 124 (block 514).

At block 516, the client adapter object 80 begins reviewing the update request message to create any new business objects 120 required to complete the updates requested in the update request message. For example, at block 516, the toolbox object 80 determines whether any of the sections in the update request message has not yet been processed. Since, in this example, the client adapter object 80 is just starting the review of the message, at least one section will be remaining and control passes to block 518.

At block 518, the client adapter object 80 determines whether any new instance(s) of business object(s) 120 are necessitated by the current message section being reviewed. If not, control returns to block 516 where review of the next message section (if present) is initiated. Otherwise, control passes to block 520. At block 520, the client adapter object 80 sends one or more requests to one or more of the toolbox objects 100 requesting the creation of any new versions of business object(s) 120 needed to process the order section under review. By way of example, not limitation, if the message section under review requests a change in the home address of subscriber A, the client adapter object 80 issues a request for a new instance of the subscriber management toolbox class and asks that new subscriber management toolbox object 106 to develop a new version of the subscriber object 122 corresponding to subscriber A. Preferably, the new version of the subscriber A object 122 corresponds to the old subscriber A object except for the modified home address field. After creating the new object(s) 120 (by using the methods in those objects), the toolbox object(s) 100 store the new object(s) 120 in the system database 83 (block 522) and update the system directories (block 524) to facilitate location of the new object(s) 120 at a later date.

Subsequently, the toolbox object(s) 100 send return messages to the order management toolbox object 102 notifying toolbox object 102 of the pathname(s) of the newly created business object(s) 100 (block 526). The order management toolbox object 102 responds by writing the pathname(s) to the order object 124 (i.e., to attribute (a) of the order object) (block 528). Control then returns to block 516.

The client adapter object 80 will continue to loop through blocks 516–518 until every message section has been reviewed and all necessary new versions of business objects 120 have been created. Once all of the message sections have been reviewed, the order management toolbox object 102 stores the order object 124 in the system database 83 (block 530) and updates the system directories so the order object 124 can be easily found at a later time and/or date (block 532). Optionally, the client adapter object 80 may then request the order management toolbox object 102 to schedule the order. If so, the order management toolbox object 102 responds by requesting the schedule management toolbox object 104 to schedule the order object 124 for application at the time and date specified in the update request message, or, if no such time or date is specified, at a default time and date (e.g., in 1 hour, the next day, as soon as possible, etc.) (block 534). Preferably, the schedule management toolbox object 104 is also asked to notify the appropriate toolbox object(s) 100 associated with any new versions of business objects 120 that are to be activated that the time for activation has arrived. The notified toolbox object(s) 100 will then co-operate with the new and old versions of the effected business object(s) to change their status as appropriate (e.g., to "applied", to "old", to "current", etc.). The order management toolbox object 102 is then deleted to save system resources.

The schedule management toolbox object 104 then waits for the designated time and date to apply the order object 124 (block 536). When that time and date arrives, the schedule management toolbox object 104 requests a new instance 102 of the order management toolbox class and notifies that new instance that the time to apply the subject order object 124 has arrived (block 538).

The new order management toolbox object 102 then retrieves the subject order object 124 from the system database 83 (block 540). The order management toolbox object 102 then requests the order object 124 to apply itself (block 542). The order object 124 responds by determining whether an order section remains unreviewed (e.g., by checking a flag or the like) (block 544). Since, in this example, the first order section is being reviewed, the order object 124 requests any object(s) associated with the pending order section to apply themselves (e.g., any changes to business objects associated with the section to be applied). Control passes to block 546 where the business object(s) 120 determine whether the order section under review requires updating of one or more SCP databases associated with network element manager 20 (block 546) by consulting the system database 83. If so, the business object(s) 120 request an instance 142 of the network element manager adapter class for that type of the network element managers and calls the translation routines shown in FIG. 6 (block 548). If not, control passes to block 550 where the business object(s) 120 determine if the pending order section is to be applied to network element manager 22. If so, the business object(s) 120 request an instance 144 of the network element manager adapter class for that type of network element manager and calls the translation routine shown in FIG. 6 (block 552). Otherwise the business object 120 continues to check whether the pending order is to be applied to each element manager in the system until blocks 554 and 556 are completed (i.e., all network element managers have been checked for applicability). Subsequently, control returns to block 544. The order object 124 continues to loop through blocks 544–556 until all order sections are applied.

With the exception of the translation database 160, 162 they address, the network element manager adapter objects 142, 144 all operate in substantially the same manner. Thus, the steps performed in response to blocks 548, 552 and 556 will all be described with respect to FIG. 6 which is generic to all network element managers 20, 22 and to all network element manager adapter objects 142, 144.

Figure 6:
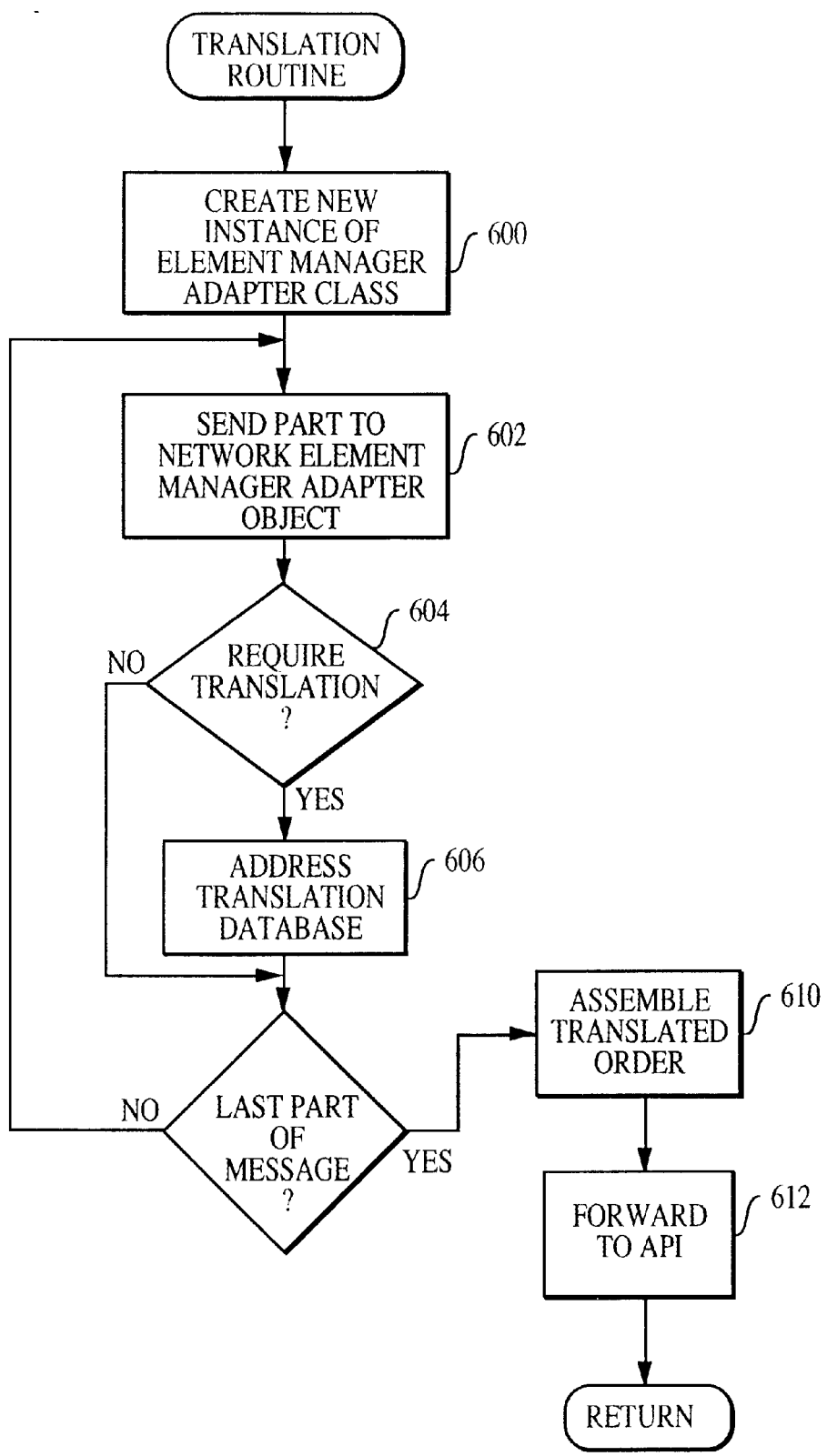
FIG. 6 is a flowchart illustrating the steps of the translation routine performed in connection with the steps of FIGS. 5A–5C.

Turning to FIG. 6, the translation routine is initiated when the order object 124 requests a new instance 142, 144 of the network element manager adapter class 140 (block 600). The type of object 142, 144 requested depends on which element manager 20, 22 is being addressed. Regardless, after receiving confirmation that the network element manager adapter object 142 or 144 is ready, the order object 124 sends a first part of the pending order section thereto (block 602). If, as is usually the case, the order requires translation (block 604), the network element manager adapter object (142 or 144) addresses its associated translation database (160 or 162) (block 606) and looks-up the corresponding message part in the appropriate network element manager format/language and stores it temporarily. When the translation of this object part is complete, the order object 124 is notified. It responds by sending the next part of the order to the network element manager adapter object (142 or 144) (block 602) or by indicating that the last part of the order has been translated (block 608). Control will continue to loop through blocks 602–608 until the entire order section has been translated.

When the entire order section has been translated, the network element manager adapter object (142 or 144) assembles the translated order (block 610) and passes the assembled order to the vendor provided API (152 or 154) associated with the network element manager in question (20 or 22). Preferably, the translated order is delivered to the network element manager 20, 22 in question via an output device such as a dedicated communication cable, but persons of ordinary skill in the art will readily appreciate that other devices may be used in this role without departing from the scope of the invention.

Persons of ordinary skill in the art will also appreciate that, although in the preferred embodiment, the global service management system 10 is implemented by a program written pursuant to object oriented programming techniques and run on a computer such as the Sun Sparc UltraOne which is commercially available from Sun Microsystems, other programming techniques and formats, and/or other computers can be utilized to implement the system 10 without departing from the scope of the invention.

In addition to the features discussed above, the global service management system 10 is also advantageous in that it is capable of responding to request messages (received via one of the input devices discussed above) by developing and displaying an indication of a status of a service at a predefined time specified by the user generating the request message. This ability is advantageous in that an authorized user can contact the system 10 at any time and receive an indication of the configuration one or more attribute(s) as they do appear, did appear, or will appear at any given time (e.g., at a time and date in the past, presently, and/or at a future time and date). This feature is particularly useful in the disclosed system 10 which, as explained above, permits users to edit their service package at any time and which permits users to defined when those changes are to be implemented. For example, if a user makes changes which are to occur in the future, and subsequently decides to make further changes, it can become difficult to remember what changes have already been implemented and when they are to occur. The above feature of the system 10 overcomes this problem by providing the user with the ability to retrieve information about the orders it has entered and/or to retrieve an indication of the state of any attribute of its service package at any point in time.

As explained above, the system 10 includes a local database 83 which duplicates some of the data stored on the SCP databases. In some instances, this duplicate data is used to provide requesting users with an indication of the status of their service package and/or one or more attributes of interest in their service package. However, in order to manage the size of the local database 83, the system 10 is preferably provided with a housekeeping object (not shown) which periodically deletes stale data (including old objects) from the local database 83. Preferably, stale data is identified by determining if the data has been accessed within a predetermined time frame such as 90 days. If it has not, it is deleted. Because of this housekeeping procedure, occasions arise where a user requests information about its service package that can no longer be provided from the local database. 83.

The system 10 addresses such circumstances by accessing data stored in the SCP database(s) when the requested status data is unavailable on the local database 83. In other words, the system 10 retrieves or pages in any needed data that is not in the system database 83 from the SCP databases. In addition to handling requests for data from clients, this network information retrieval feature is also employed in instances where business objects 120 or toolbox objects 100 require data from an SCP database that is not present on the local database 83. Persons of ordinary skill in the art will appreciate that this network information retrieval process is heavily employed at system turn-on, and, on occasions such as when a subscriber edits his/her service package for either the first time through the system 10, or for the first time since the expiration of the predetermined time period so that the user's associated objects have been deleted from the local database 83.

Figure 7A:
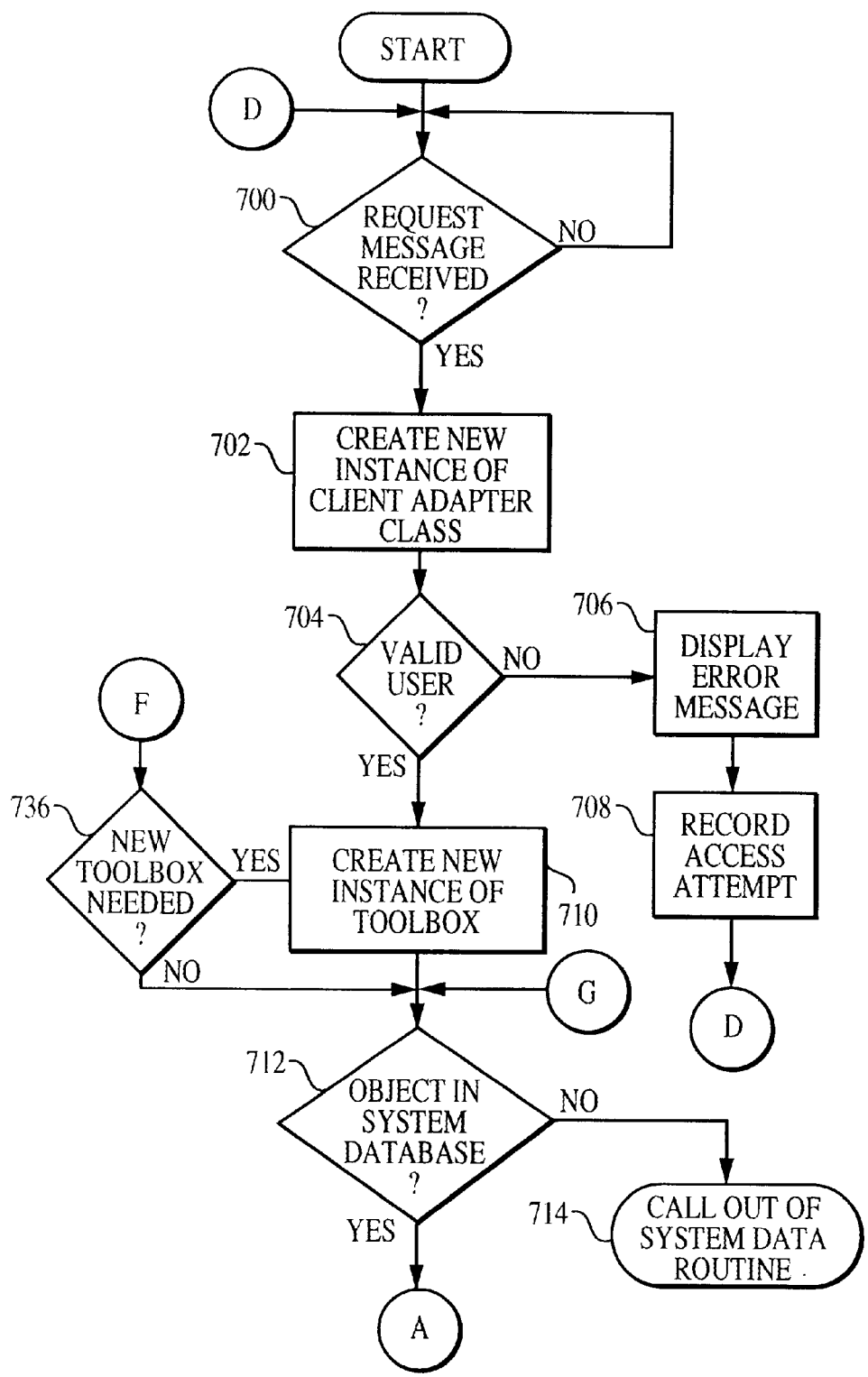
FIGS. 7A–7C are flowcharts illustrating the steps performed by the global service management system of FIG. 1 in receiving a request message soliciting data stored in the system and/or in the database(s) of the SCP(s).

The steps performed by the global service management system 10 upon receipt of a request message soliciting an indication of a status of a service (network information retrieval) are illustrated in FIGS. 7A–7C and 8A–8B. Turning first to FIG.7A, upon receiving a request message via one of the input devices illustrated in FIG. 3 (block 700), the system 10 creates a new instance 80 of the appropriate version of the client adapter class (block 702). The new client adapter object (82, 84, 86 or 88) then addresses the system database 83 to determine whether the user requesting the information is authorized to do so (block 704). This validation step is preferably performed by comparing a personal identification number (P.I.N.) entered by the user against a database as is well known in the art.

If the client adapter object 80 determines that the user is not authorized to access the system 10 in the manner requested, it returns an error message to the user via the appropriate input device (block 706). It then records the date and time of the unauthorized access attempt, together with the information entered by the user in an error log (block 708) to enable tracking of unusual, and possibly fraudulent, unauthorized access attempts.

If the client adapter object 80 determines that the accessing user is valid (block 704), it requests the creation of one or more new instances of the appropriate toolbox class(es) 100 (block 710). For example, if the request message solicits information contained in a subscriber object 122, the client adapter object 80 requests the creation of a new subscriber management toolbox object 106. The new toolbox object(s) then attempt to retrieve the business object(s) storing the requested information from the local database 83 (block 712). For instance, in the above example, the subscriber management toolbox object 106 will utilize the system directories to attempt to locate and retrieve the appropriate subscriber object 122. If the subscriber object 122 is not present in the local database 83, the toolbox object 100 calls the out-of-system data routine discussed below in connection with FIGS. 8A–8B (block 714).

Figure 7B:
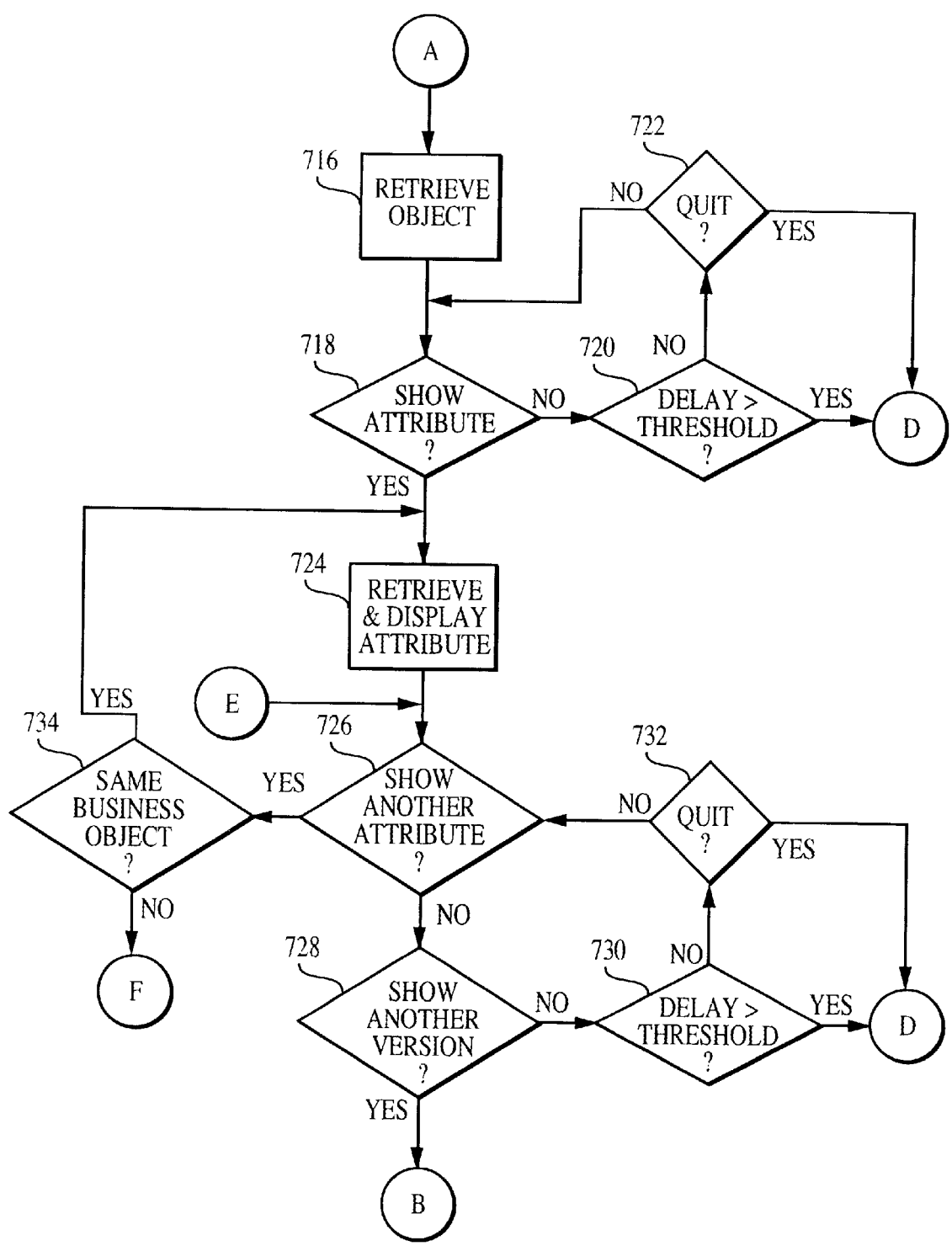

Assuming for the moment that the business object 120 in question is present on the local database 83, as shown in FIG. 7B, the toolbox object 100 next retrieves the business object 120 (block 716). The client adapter object 80 notifies the user that the information is available and requests an identification of what attribute the user wishes to view (block 718). The system 10 then waits for a response. If a delay longer than a predetermined time period occurs without response from the user (block 720), or if the user affirmatively quits the application (block 722), the client adapter object 80 terminates the connection with the user and returns to block 700 in FIG. 7A. Otherwise, upon receiving a request to display an attribute (block 718), the business object 120 provides the requested attribute to the toolbox object 100 which, in turn, provides this information to the client adapter object 80 (block 724). The client adapter object 80 forwards the requested attribute to the user. The client adapter object 80 then enters another loop represented by blocks 726–732 where the user is given a predefined time period to request another attribute (block 726), to request another version of the attribute (e.g., an earlier or future version) (block 728), or to quit the application (block 732). If the user does not respond within a predetermined time period, the client adapter object 80 terminates the connection with the user (block 730) and returns to block 700 in FIG. 7A.

If the user asks to view another attribute (block 726), control returns to block 724 if the requested attribute is contained in the same business object 120 (block 734). If the requested attribute is not in the business object retrieved at block 716 (block 734), control proceeds to block 736 in FIG. 7A. At block 736, the client adapter object 80 determines whether a new toolbox object 100 is needed to obtain the requested attribute. If not, control proceeds to block 712. Otherwise, control advances to block 710.

Figure 7C:
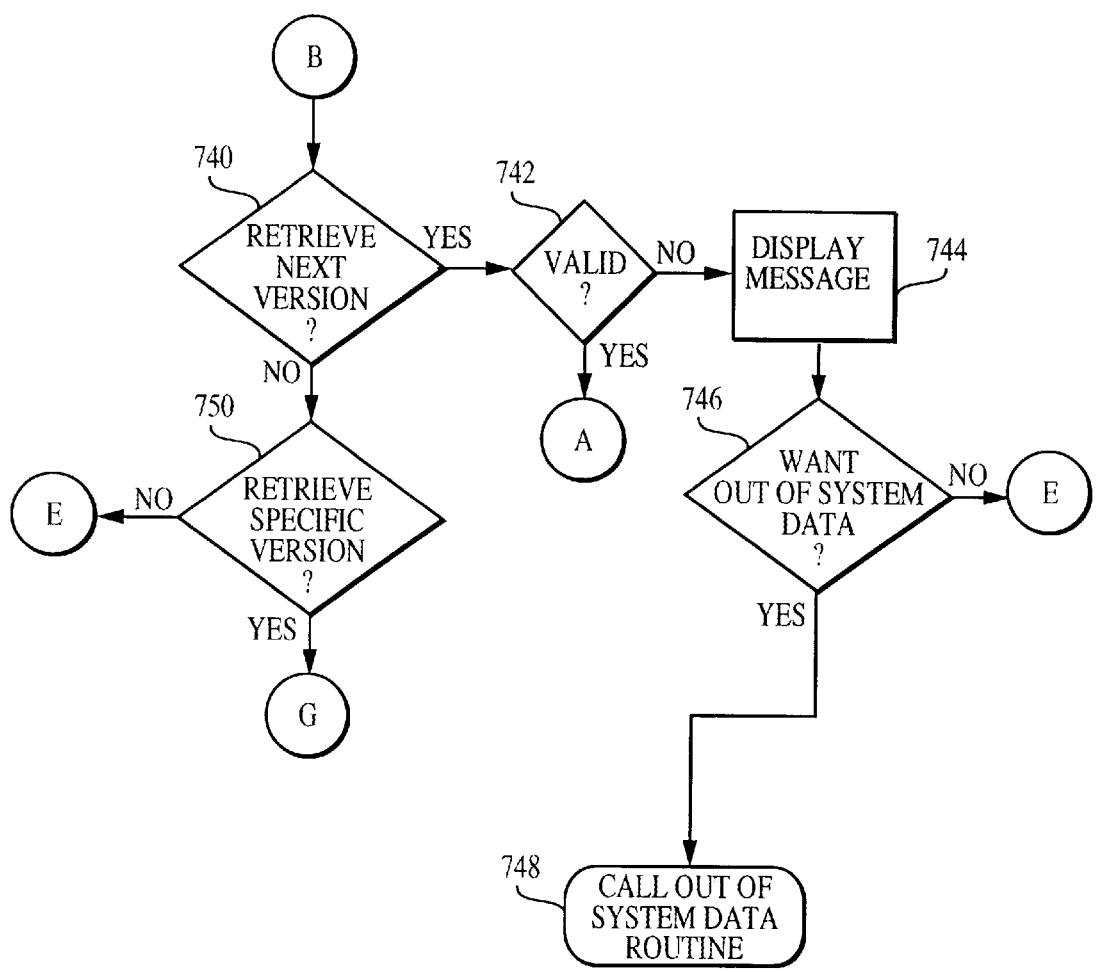

If, at block 728 (FIG. 7B), the user indicates a desire to see another version of the attribute currently being displayed, control proceeds to block 740 (FIG. 7C). At block 740, the client adapter object 80 provides the user with an opportunity to retrieve the next version (i.e., the next version that is to be implemented or was implemented after the current version). If the user indicates a desire to retrieve the next version, the system 10 checks to determine if a next version exists in the local database (block 742). If it does, control proceeds to block 716 (FIG. 7B). Otherwise, the client adapter object 80 displays a message indicating that the requested data either does not exist or has been "archived" (i.e., has been deleted from the local database 83) (block 744). The user is then given the opportunity to request the system 10 to attempt to retrieve the "archived" data from the SCP databases (block 746). If the user requests such an attempt, the out-of-system data routine is called (block 748). Otherwise, control returns to block 726 (FIG. 7B).

Returning to block 740, if the user does not request the next version of the displayed attribute, the client adapter object 80 offers the user the opportunity to request a specific version of the attribute (i.e., either earlier or later in time than the currently displayed version) (block 750). If the user indicates that it does not want to specify a version (block 750), control returns to block 726 (FIG. 7B). Otherwise, if the user identifies a specific version, control returns to block 712 (FIG. 7A).

Figure 8A:
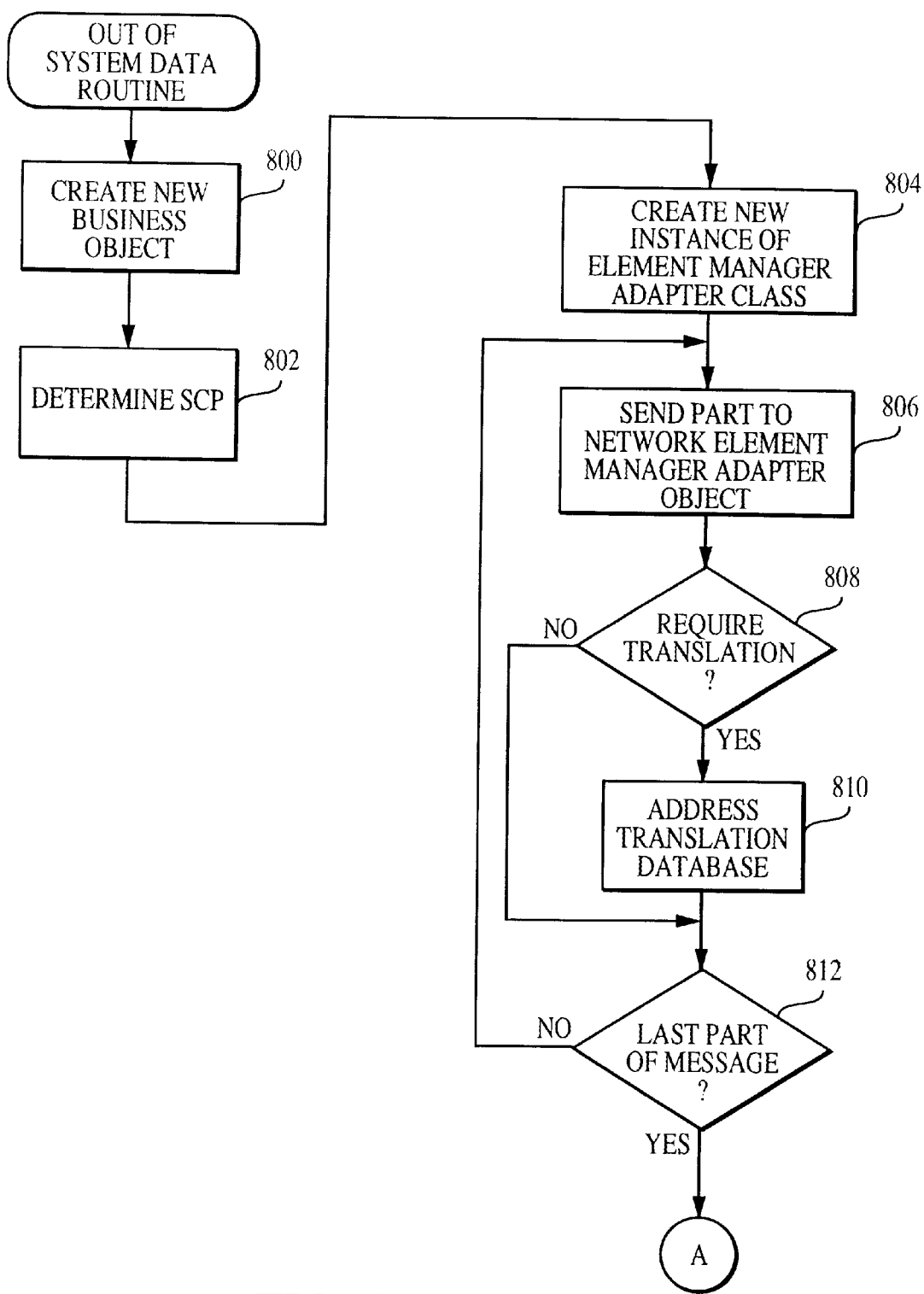
FIGS. 8A–8B are flowcharts illustrating the out-of-system data routine performed by the system in connection with the steps of FIGS. 7A–7C.
Figure 8B:
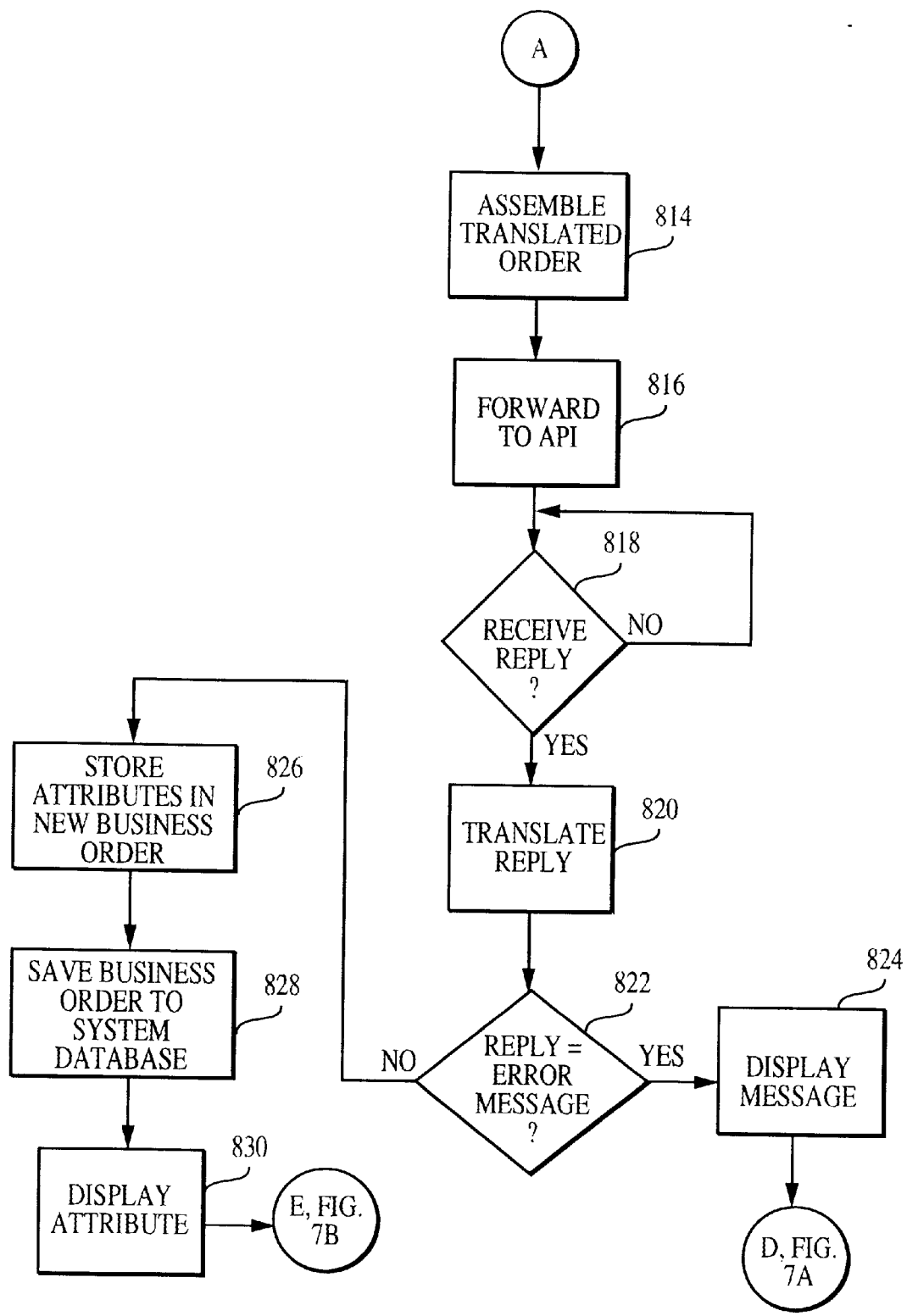

Turning to FIGS. 8A–8B, when the out-of-system data routine is called (block 714 in FIG. 7A or block 748 in FIG. 7C), the relevant toolbox object 100 creates a new business object for storage in the local database 83 (block 800). It then accesses the system database 83 to determine which SCP stores the out-of-system data desired (block 802). Once this determination is made, the toolbox 100 requests the creation of a new instance (142 or 144) of the network element manager adapter class 140 (block 804). The toolbox object 100 then parses and begins feeding the request for data to the new network element manager adapter object (142 or 144) in a piece by piece fashion (block 806). If the request requires translation (as will typically be the case) (block 808), the network element manager adapter object (142 or 144) translates the message part by looking it up in the translation database (160 or 162). Control continues to loop through blocks 806–812 until the entire message has been delivered to the network element manager adapter object (142 or 144) (block 812). The network element manager adapter object (142 or 144) then assembles the translated request (block 814), and forwards it to the API object (152 or 154) of the appropriate network element manager (20 or 22) (block 816).

The network element manager adapter object (142 or 144) then waits to receive a reply from the element manager (20 or 22) (block 818). Upon receiving the reply, the network element manager adapter object (142 or 144) reverse translates the reply into GSMS format (block 820) by addressing the look-up table in the translation database (160 or 162). If the reply is an error message (block 822), the network element manager adapter (142 or 144) relays that message to the requesting toolbox object 100, which, in turn, relays the message to the appropriate client adapter object 80. The client adapter object 80 forwards the error message to the user and control returns to block 700 of FIG. 7A.

If the reply is not an error message (block 822), the retrieved data is forwarded to the requesting toolbox 100 via the element manager adapter object (142 or 144), and the retrieved attribute(s) are stored (block 826) in the new business order 120 created at block 800. The toolbox object 100 then stores the new business order 120 to the system database 83 and updates the system directories appropriately (block 828). The retrieved attribute(s) are then forwarded to the user via the client adapter object 80 (block 830), and control proceeds to block 726 in FIG. 7B.

If a user subscribes to a service such as the alternate routing service offered by Ameritech which develops triggers that can change data on the SCP databases without involving the global service management system 10, in some instances, the data on the local database 83 may be unreliable. To address such a situation, the system 10 identifies any attribute that can be changed in this manner as "volatile" in the appropriate business object(s) 120, and, whenever this data is to be used for any purpose, the system 10 pages in the attribute (i.e., retrieves the required network information) from the SCP database(s) in accordance with the above described methods.

Those skilled in the art will further appreciate that, although the invention has been described in connection with certain embodiments, there is no intent to limit the invention thereto. On the contrary, the intention of this patent is to cover all modifications and embodiments fairly falling within the scope of the appended claims either literally or under the doctrine of equivalents.

What is claimed is:

1. For use in an advanced intelligent network having a global service management system, a first service control point (SCP) of a first vendor, the first SCP being serviced by a first network element manager in communication with the global service management system, the first service control point and the first network element manager operating under a first protocol of the first vendor, and a second service control point of a second vendor, the second SCP being serviced by a second network element manager in communication with the global service management system, the second service control point and the second network element manager operating under a second protocol of the second vendor, the first protocol being incompatible with the second protocol and the second SCP, each of the first and second service control points having a database, a method for selectively updating the databases of the first and second service control points comprising:

receiving at the global service management system an update request message developed pursuant to a third protocol;

identifying at the global service management system the update request message as being directed to the first service control point and the second service control point;

at the global service management system, translating the update request message from the third protocol to the first protocol and from the third protocol to the second protocol;

delivering the translated update request message from the global service management system to the first network element manager in accordance with the first protocol and delivering the translated update request message from the global service management system to the second network element manager in accordance with the second protocol;

communicating the translated update request message from the first network element manager to the first SCP in accordance with the first protocol; and communicating the translated update request message from the second network element manager to the second SCP in accordance with the second protocol, thereby updating both the first SCP of the first vendor and second SCP of the second vendor in response to the update request message.

2. A method as defined in claim 1 wherein the second protocol is identical to the third protocol.

3. A method as defined in claim 1 further comprising:

permitting a customer to enter an update request message to the global service management system via the internet.

4. A method as defined in claim 1 further comprising:
employing a cryptographic at the global service management system technique to restrict access to the first and second control points.

5. For use in an advanced intelligent network having a first service control point serviced by a first network element manager, the first service control point and the first network element manager operating under a first protocol which is specific to a vendor of the first service control point, and a second service control point serviced by a second network element manager, the second service control point and the second network element manager operating under a second protocol which is specific to a vendor of the second service control point, the first protocol being different from and incompatible with the second protocol, each of the first and second service control points having a database, a service management system in communication with both the first network element manager and the second network element manager and comprising:
an input device for receiving an update request message developed pursuant to a third protocol;
means for identifying at least one of the first and second service control points as a destination of the update request message, including means for identifying one or more vendor-specific protocols associated with the at least one of the first and second service control points for operation of the at least one of the first and second service control points in accordance with the update request message; and
a translator for translating the update request message to at least one of the first and second protocols for communication from the service management system to at least one of the first network element manager and the second network element manager.

6. A service management system as defined in claim 5 wherein, when the identifying means identifies the destination of the update request message as the first service control point, the translator translates the update request message from the third protocol to the first protocol and the translated message is delivered to the first service control point.

7. A service management system as defined in claim 5 wherein, when the identifying means identifies the destination of the update request message as the second service control point, the translator translates the update request message from the third protocol to the second protocol and the translated message is delivered to the second service control point.

8. A service management system as defined in claim 5 wherein, when the identifying means identifies the destination of the update request message as both the first and the second service control points, the translator translates the update request message from the third protocol to both the first and the second protocols and the output device delivers the translated messages to corresponding ones of the first and the second service control points.

9. A service management system as defined in claim 5 wherein the second protocol is identical to the third protocol.

10. A service management system as defined in claim 5 wherein the first protocol is identical to the third protocol.

11. A service management system as defined in claim 5 wherein the identification means accesses a system database to identify the at least one service control point as the destination.

12. A service management system as defined in claim 5 wherein the translator is associated with a translation database for translating the update request message.

13. A service management system as defined in claim 5 further comprising an output device for delivering the update request message to a destination at at least one of the first network element manager and the second network element manager.

14. A service management system as defined in claim 13 wherein the output device comprises a communication cable for communicating the output of the translator to a network element manager associated with the destination.

15. For use in an advanced intelligent network having a first service control point serviced by a first network element manager and other service control points, the first service control point having an SCP database, a service management system in communication with the first network element manager and comprising:
an input device for receiving a request message; and
a processor in communication with the input device and the first network element manager for developing an indication of a status of a service at a predefined time in response to the request message, the processor and the first network element manager cooperating in accordance with a vendor-specific protocol associated with the first service control point, the vendor specific protocol being different from other protocols of other vendors of the other service control points.

16. A service management system as defined in claim 15 further comprising a local database duplicating data indicating the status of predefined services stored in the SCP database.

17. A service management system as defined in claim 16 wherein the processor manages the size of the local database by periodically deleting stale data.

18. A service management system as defined in claim 17 wherein the processor identifies stale data by determining if it has been accessed within a predetermined time frame.

19. A service management system as defined in claim 16 wherein the processor accesses data stored in the SCP database when the status data is unavailable on the local database.

20. A global service management system for processing update messages requesting modifications to an advanced intelligent network employing service control points of different vendors having network element managers communicating data with the global service management system for updating the network element managers by the global service management system, at least a first service control point operating according to a first vendor-specific format and at least a second service control point operating according to a second vendor-specific format, the global service management system comprising:
at least one message receiver for receiving update request messages;
a first primary controller for processing update request messages requesting modifications relating to a first business function of the advanced intelligent network;
a second primary controller for processing update request messages requesting modifications relating to a second business function of the advanced intelligent network;
at least one system flow controller interfacing with the at least one message receiver and with at least one of the first and second primary controllers for managing the first and second primary controllers to process update request messages received by the at least one message receiver; and
at least one translator associated with at least one first service control point for translating the processed update request messages into the first vendor-specific format usable by the network element manager of the at least one first service control point for communication from the global service management system to the network element manager.

21. A system as defined in claim 20 wherein the at least one message receiver comprises an audio response receiver for receiving update request messages in an audio response unit format from an audio response unit.

22. A system as defined in claim 21 wherein the audio response receiver is adapted to translate received update request messages from the audio response unit format to a format which is understandable to the first and second primary controllers and to the at least one system flow controller.

23. A system as defined in claim 22 wherein the understandable format comprises CORBA IIOP.

24. A system as defined in claim 20 wherein the at least one message receiver comprises an automatic provisioning message receiver for receiving update request messages in an automatic provisioning system format from an automatic provisioning system.

25. A system as defined in claim 24 wherein the automatic provisioning message receiver is adapted to translate received update request messages from the automatic provisioning system format to a format which is understandable to the first and second primary controllers and to the at least one system flow controller.

26. A system as defined in claim 20 wherein the understandable format comprises CORBA IIOP.

27. A system as defined in claim 20 wherein the at least one message receiver comprises a network provisioning message receiver for receiving update request messages in a network provisioning format from a network.

28. A system as defined in claim 27 wherein the network comprises a local area network.

29. A system as defined in claim 27 wherein the network comprises the internet.

30. A system as defined in claim 20 wherein the at least one message receiver comprises an oversight controller for order creation.

31. A global service management system for managing a plurality of incompatible service control points (SCPs) in a telecommunications network, the global service management system comprising:

a system core which controls the global service management system in response to received messages;

a system database coupled with the system core which stores the received messages;

a first translator coupled with the system core and configured for communication with a first SCP, the first SCP including a first SCP database, the first translator translating an update request message in a common format to a first format usable by the first SCP for updating the first SCP database; and a second translator coupled with the system core and configured for communication with a second SCP, the second SCP including a second SCP database, the second translator translating the update request message in the common format to a second format usable by the second SCP for updating the second SCP database, the second format being incompatible with the first format and the first SCP.

32. The global service management system of claim 31 wherein the system database stores the received messages in the common format.

33. The global service management system of claim 32 wherein the receives the received messages in the common format.

34. A method for operating a global service management system in conjunction with a first service control point (SCP) of a first vendor and a second service control point of a second vendor in a telecommunications system, the method comprising:

receiving an update request message from a user;

storing the update request message in a standard message format;

scheduling delivery of the update request message;

when scheduled, translating the update request message to a first translated message and a second translated message, each message having a respective vendor-specific message format associated with a vendor of a respective SCP;

delivering the first translated message and the second translated message when scheduled to respective network element managers, each respective network element manager being associated with a respective SCP and configured to communicate with the respective SCP according to the respective vendor-specific message format;

when an error occurs, receiving an error indication from a network element manager;

notifying the user of an error condition; and if no error indication is received, applying the translated first translated message and the second translated message to respective SCPs.

35. The method of claim 34 further comprising:

determining if the user withdrew the update request message; and if so, deleting the update request message.

* * * * *